(12) United States Patent
Hirakata

(10) Patent No.: US 12,341,438 B2
(45) Date of Patent: Jun. 24, 2025

(54) POWER CONVERTER

(71) Applicant: FUJI ELECTRIC CO., LTD., Kawasaki (JP)

(72) Inventor: Masaki Hirakata, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 250 days.

(21) Appl. No.: 18/307,349

(22) Filed: Apr. 26, 2023

(65) Prior Publication Data
US 2023/0412089 A1 Dec. 21, 2023

(30) Foreign Application Priority Data
Jun. 9, 2022 (JP) .................................. 2022-093897

(51) Int. Cl.
*H02M 7/00* (2006.01)
(52) U.S. Cl.
CPC .................................. *H02M 7/003* (2013.01)
(58) Field of Classification Search
CPC .............................. H02M 7/003; H02M 7/48
See application file for complete search history.

(56) References Cited

U.S. PATENT DOCUMENTS

| | | | |
|---|---|---|---|
| 11,328,985 B2 | 5/2022 | Hayashiguchi et al. | |
| 2014/0085955 A1* | 3/2014 | Maeda | H02M 7/5387 363/132 |
| 2014/0110752 A1* | 4/2014 | Fujino | H10D 64/62 257/133 |
| 2021/0098347 A1 | 4/2021 | Hayashiguchi et al. | |
| 2022/0246507 A1 | 8/2022 | Hayashiguchi et al. | |

FOREIGN PATENT DOCUMENTS

WO 2019/239771 A1 12/2019

* cited by examiner

*Primary Examiner* — Adolf D Berhane
*Assistant Examiner* — Afework S Demisse

(57) ABSTRACT

An object of the present invention is to provide a power converter capable of reducing inductance and preventing a manufacturing process from becoming complicated. A power converter 1A includes a capacitor 2A including a first bus bar 21A configured to include a positive electrode terminal 211, a negative electrode terminal 212 arranged to face the positive electrode terminal 211 with a first gap 214, and a first insulating member 213 arranged in the first gap 214 and a semiconductor module 3A including a second bus bar 31A configured to include a positive electrode input terminal 311 overlapped with and connected to the positive electrode terminal 211, a negative electrode input terminal 312 arranged to face the positive electrode input terminal 311 with a second gap 314 and overlapped with and connected to the negative electrode terminal 212, and a second insulating member 313 arranged between the positive and negative input terminals 311 and 312 and including a contact surface 313c in contact with one of a front surface 213a or a back surface 213b of the first insulating member 213, and configured to be fitted with the first bus bar 21A.

12 Claims, 10 Drawing Sheets

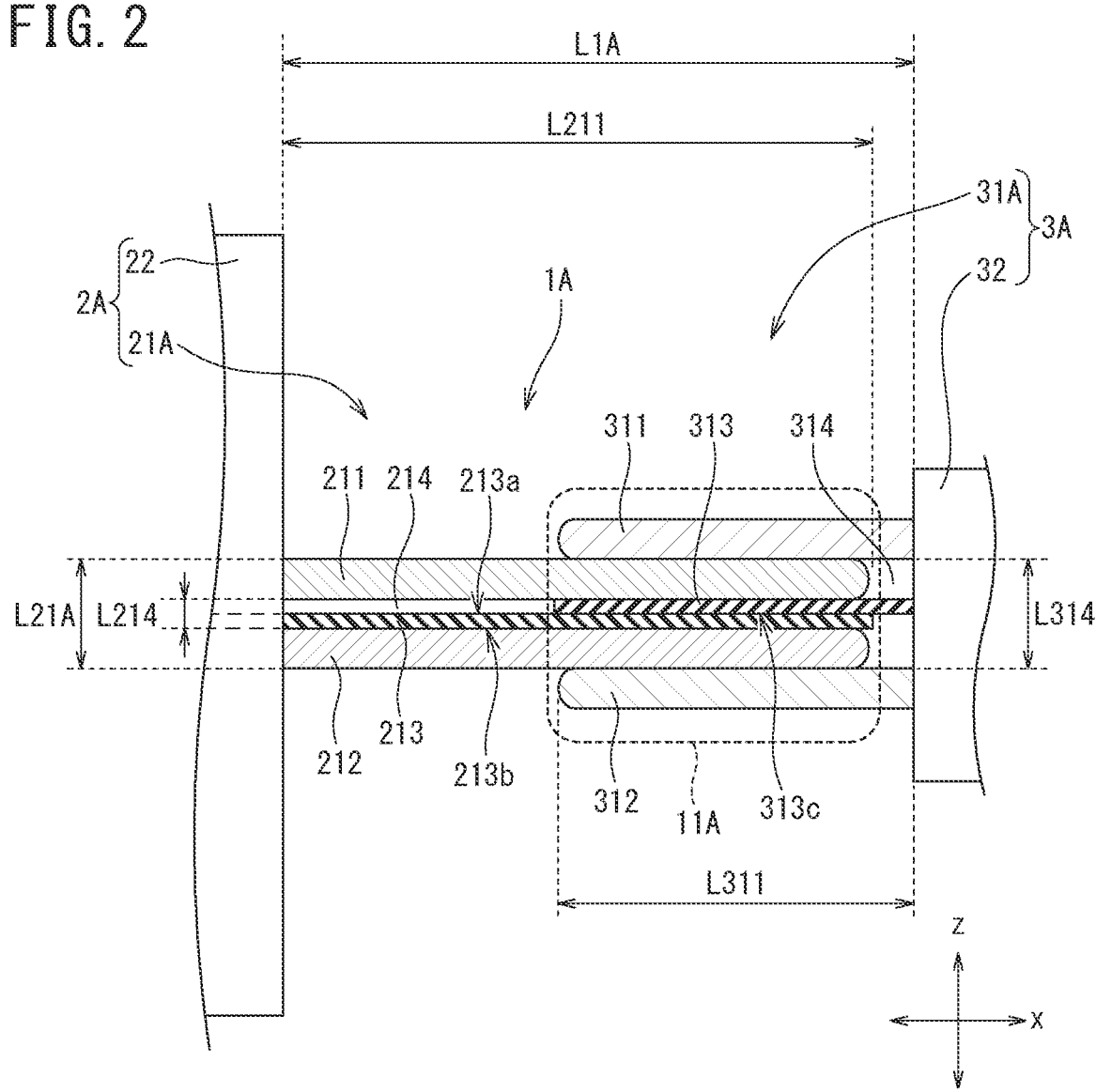

POWER CONVERTER

CROSS-REFERENCE TO RELATED APPLICATION

This application claims benefit of priority under 35 USC 119 to Japanese Patent Application No. 2022-093897, filed on Jun. 9, 2022, in the Japan Patent Office, the entire contents of which are incorporated by reference herein.

TECHNICAL FIELD

The present invention relates to power converters.

BACKGROUND ART

PATENT LITERATURE 1 discloses a semiconductor module including a semiconductor device and a bus bar. The semiconductor device of the semiconductor module includes a first input terminal having a first terminal portion, a second input terminal having a second terminal portion overlapped with the first terminal portion as viewed along a thickness direction, and an insulating member arranged between the first and second terminal portions. The bus bar of the semiconductor module includes a first supply terminal, a second supply terminal that is spaced apart from the first supply terminal in the thickness direction and that is at least partially overlapped with the first supply terminal as viewed along the thickness direction, and an insulator arranged between the first and second supply terminals and having a pair of separated portions. The first supply terminal and the first terminal portion are joined in a conductive state by laser welding, and the second supply terminal and the second terminal portion are joined in a conductive state by laser welding. The insulating member is inserted into a gap provided between the pair of separated portions of the insulator.

CITATION LIST

Patent Literature

PATENT LITERATURE 1: WO 2019/239771

SUMMARY OF INVENTION

Technical Problem

When connecting a semiconductor module and a capacitor by using bus bars provided with a laminated structure including two terminals and an insulating member between the two terminals, as in the bus bar described in PATENT LITERATURE 1, an effect of reducing inductance in the bus bars is reduced as a lamination interval of the bus bars increases. Narrowing the lamination interval of the bus bars in order to suppress the reduction in the effect of reducing inductance in the bus bars makes it difficult to secure a clearance for tightly fitting the bus bars together between the lamination interval of one of the bus bars and the lamination interval of the other bus bar. Therefore, in manufacturing of a power converter including a semiconductor module and a capacitor, it is difficult to fit bus bars together, resulting in a complicated process for manufacturing the power converter. Additionally, when, as in PATENT LITERATURE 1, the terminals are joined to each other by laser welding, the terminals forming the laminated structure can be connected to each other as they are in the laminated state, but laser welding is required, thus complicating the connection step.

It is an object of the present invention to provide a power converter capable of reducing inductance and preventing a manufacturing process from becoming complicated.

Solution to Problem

In order to achieve the above object, a power converter according to one aspect of the present invention comprises: a capacitor including a first bus bar configured to include a positive electrode terminal, a negative electrode terminal arranged to face the positive electrode terminal with a first gap, and a first insulating member arranged in the first gap, the first bus bar being arranged in an exposed manner; and a semiconductor module including a second bus bar configured to include a positive electrode input terminal overlapped with and connected to the positive electrode terminal, a negative electrode input terminal arranged to face the positive electrode input terminal with a second gap and overlapped with and connected to the negative electrode terminal, and a second insulating member arranged between the positive electrode input terminal and the negative electrode input terminal and including a contact surface in contact with one of a front surface or a back surface of the first insulating member, the second bus bar being arranged in an exposed manner and fitted with the first bus bar.

Advantageous Effects of Invention

According to the one aspect of the present invention, inductance cam be reduced, and also a manufacturing process can be prevented from becoming complicated.

BRIEF DESCRIPTION OF DRAWINGS

FIG. 2 is a schematic view illustrating an enlarged cross section in a vicinity of a fitting portion of a capacitor and a semiconductor module included in the power converter according to Embodiment 1 of the present invention.

DESCRIPTION OF EMBODIMENTS

Embodiments of the present invention exemplify devices and methods for embodying the technological concept of the present invention, and the technological concept of the present invention is not specific to materials, shapes, structures, arrangements, and the like of components exemplified in the embodiments given below. The technological concept of the present invention may be modified in various ways within the technological scope defined in the appended claims.

Embodiment 1

A power converter according to Embodiment 1 of the present invention is described using FIGS. 1 to 4. First, a schematic configuration of a power converter 1A according to the present embodiment is described using FIGS. 1 and 2. Hereinafter, for convenience in describing the power converter 1A, a thickness direction of a first insulating member is referred to as "z direction." Further, a direction in which a capacitor and a semiconductor module face each other is referred to as "x direction." Furthermore, a direction orthogonal to both z and x directions is referred to as "y direction."

(Configuration of Power Converter)

Figure 1:
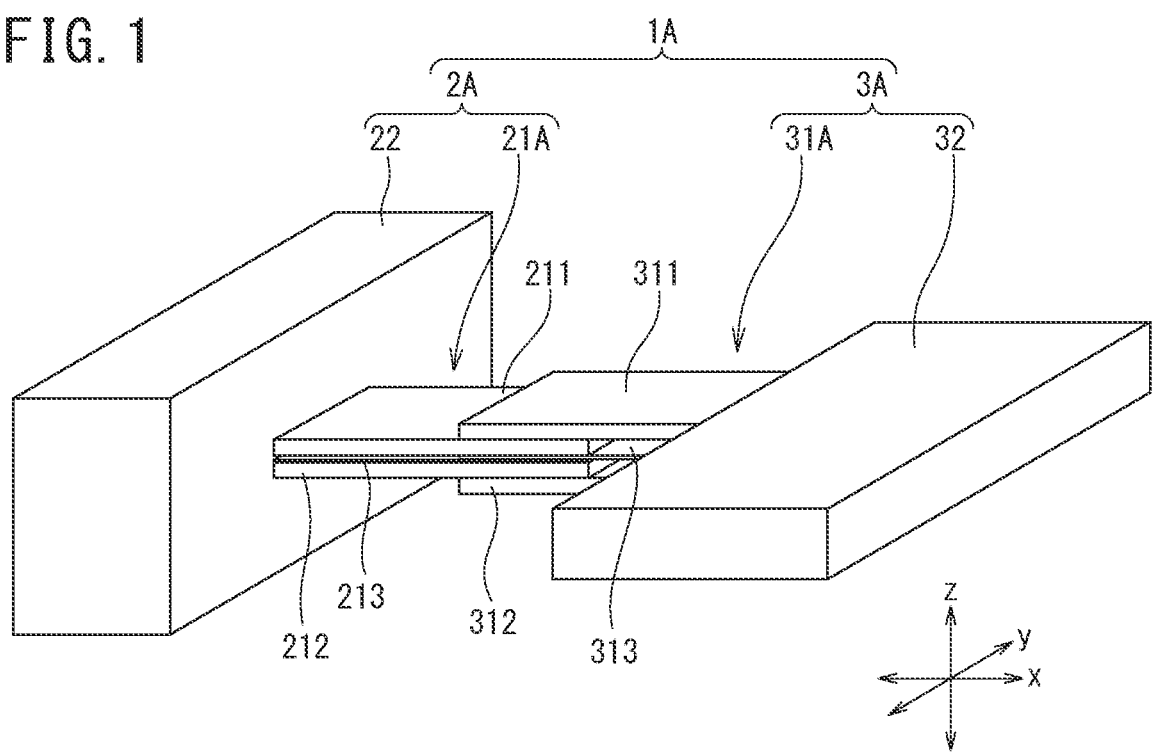
FIG. 1 is a schematic exterior view illustrating an example of a schematic configuration of a power converter according to Embodiment 1 of the present invention.

FIG. 1 is a perspective view schematically illustrating an exterior appearance of the power converter 1A according to the present embodiment. FIG. 2 is a schematic view illustrating an enlarged vicinity of a fitting portion 11A of a capacitor 2A and a semiconductor module 3A included in the power converter 1A. In FIG. 2, for ease of understanding, a first bus bar 21A provided in the capacitor 2A and a second bus bar 31A provided in the semiconductor module 3A are illustrated in a cross section taken along the x direction through a center of the y direction.

As illustrated in FIG. 1, the power converter 1A includes the capacitor 2A including a mold resin 22 having, for example, a rectangular parallelepiped shape and the first bus bar 21A arranged to be exposed from the mold resin 22. The power converter 1A includes the semiconductor module 3A including a mold resin 32 having, for example, a rectangular parallelepiped shape and the second bus bar 31A arranged to be exposed from the mold resin 32. The capacitor 2A and the semiconductor module 3A are fitted together in a conductive state by the first and second bus bars 21A and 31A.

The capacitor 2A includes an electrode portion 24 (not illustrated in FIG. 1; see FIG. 3B) electrically connected to the first bus bar 21A. The electrode portion 24 is arranged to be exposed from the mold resin 22 on a side opposite to a direction in which the first bus bar 21A is exposed. The electrode portion 24 is connected to a power supply device 8 (not illustrated in FIG. 1; see FIG. 3B) that generates electric power to be supplied to the semiconductor module 3A. The capacitor 2A includes a structure (not illustrated) having a predetermined capacitance in the mold resin 22. The structure is arranged between the electrode portion 24 and the first bus bar 21A, and is electrically connected to each of the electrode portion 24 and the first bus bar 21A. The capacitor 2A stores DC power supplied from the power supply device 8 in the structure, and supplies it to the semiconductor module 3A. The DC power continuously continues to be supplied from the power supply device 8 to the capacitor 2A, so that the capacitor 2A can continuously supply the DC power to the semiconductor module 3A. Thus, the capacitor 2A serves as an energy buffer in supplying electric power from the power supply device 8 to the semiconductor module 3A. The power converter 1A is configured to allow the capacitor 2A to serve as the energy buffer so as to supply electric power from the power supply device 8 to the semiconductor module 3A via the capacitor 2A. As a result, the power converter 1A can reduce impedance of a power supply wiring for supplying electric power from the power supply device 8 to the semiconductor module 3A.

The semiconductor module 3A includes a plurality of switching elements Q (not illustrated in FIG. 1; see FIG. 3B) sealed in the mold resin 32, a controller (not illustrated) that controls the plurality of switching elements Q, and the like. The plurality of switching elements Q is operated using, as a power source, the electric power supplied to the semiconductor module 3A via the capacitor 2A. The semiconductor module 3A is configured so as to allow for various power conversions such as DC-AC conversion and DC-DC conversion according to combinations of the plurality of switching elements Q and a method of controlling the plurality of switching elements Q by the controller.

As illustrated in FIG. 2, the capacitor 2A included in the power converter 1A includes the first bus bar 21A that includes a positive electrode terminal 211, a negative electrode terminal 212 arranged to face the positive electrode terminal 211 with a first gap 214, and a first insulating member 213 arranged in the first gap 214 and that is arranged in an exposed manner. The positive electrode terminal 211 and the negative electrode terminal 212 are made of a conductive material (e.g., copper). The first insulating member 213 may be made of an insulating material (e.g., a material containing glass epoxy resin) or may be composed of, for example, insulating paper. Additionally, the first insulating member 213 may be extended from an inside of the capacitor 2A (e.g., a place covered with the mold resin 22).

As illustrated in FIG. 1, the positive and negative electrode terminals 211 and 212 have a rectangular flat plate shape as viewed along the z direction. Conductive flat plate members forming the positive and negative electrode terminals 211 and 212 and the first insulating member 213 are arranged to be overlapped with each other as viewed along the z direction.

Returning to FIG. 2, the first insulating member 213 is arranged in contact with the negative electrode terminal 212 and a negative electrode input terminal 312. The first insulating member 213 is attached and fixed to the negative electrode terminal 212 and the negative electrode input terminal 312 by, for example, an insulating adhesive (not illustrated). Alternatively, the first insulating member 213 may be attached and fixed to the negative electrode terminal 212 and the negative electrode input terminal 312 by, for example, a conductive adhesive (not illustrated).

In the present embodiment and each of embodiments and each of modifications described below, when the first insulating member is attached to negative electrode side members such as a negative electrode terminal and a negative electrode side electrode or positive electrode side members such as a positive electrode terminal and a positive electrode side electrode by an insulating adhesive, the adhesive is considered to be a part of the first insulating member. Therefore, even when the first insulating member is attached to the negative side members or the positive side members by the adhesive, the first insulating member can be considered to be in contact with the negative side members or the positive side members. On the other hand, in the present embodiment and each of the embodiments and each of the modifications described below, when the first insulating member is attached to negative electrode side members such as a negative electrode terminal and a negative electrode side electrode or positive electrode side members such as a positive electrode terminal and a positive electrode side electrode by a conductive adhesive, the adhesive is considered to be a part of the negative electrode side members or the positive electrode side members. Therefore, even when the first insulating member is attached to the negative electrode side members or the positive electrode side members by the adhesive, the first insulating member can be considered to be in contact with the negative electrode side members or the positive electrode side members.

As illustrated in FIG. 2, the semiconductor module 3A included in the power converter 1A includes the second bus bar 31A that includes a positive electrode input terminal 311 overlapped with and connected to the positive electrode terminal 211, the negative electrode input terminal 312 arranged to face the positive electrode input terminal 311 with a second gap 314 and overlapped with and connected to the negative electrode terminal 212, and a second insulating member 313 arranged between the positive electrode input terminal 311 and the negative electrode input terminal 312 and including a contact surface 313c in contact with one of a front surface 213a or a back surface 213b of the first insulating member 213 and that is arranged in an exposed manner and fitted with the first bus bar 21A.

The positive electrode input terminal 311 and the negative electrode input terminal 312 are made of a conductive material (e.g., copper). The positive electrode input terminal 311 may be made of the same material as that of the positive electrode terminal 211, and the negative electrode input terminal 312 may be made of the same material as that of the negative electrode terminal 212. This can reduce contact resistance between the positive electrode input terminal 311 and the positive electrode terminal 211 and contact resistance between the negative electrode input terminal 312 and the negative electrode terminal 212. The second insulating member 313 may be made of an insulating material (e.g., a material containing glass epoxy resin) or may be composed of, for example, insulation paper.

Figure 3A:
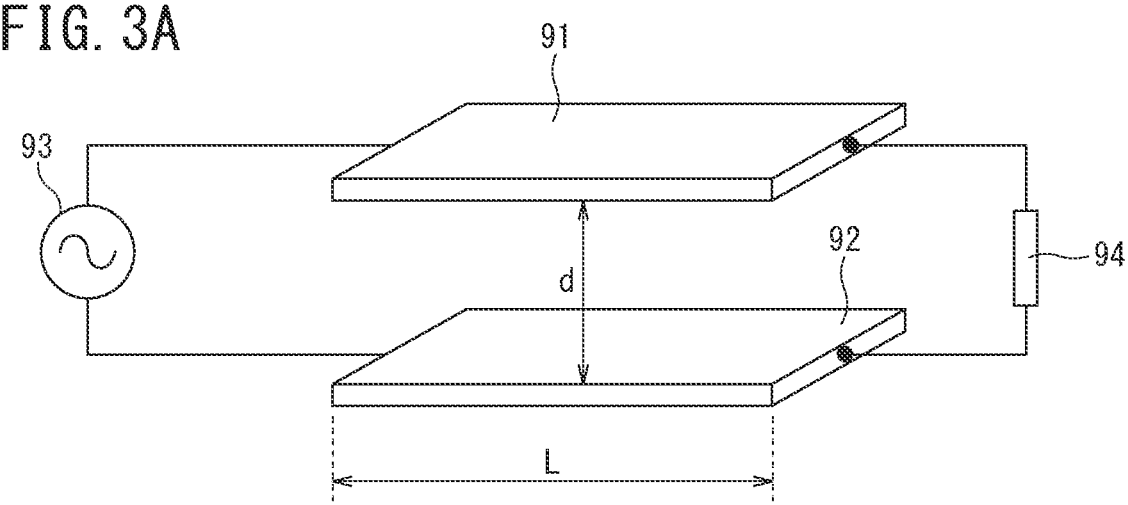
FIGS. 3A and B are diagrams for illustrating an operation effect of the power converter according to Embodiment 1 of the present invention.
Figure 3B:
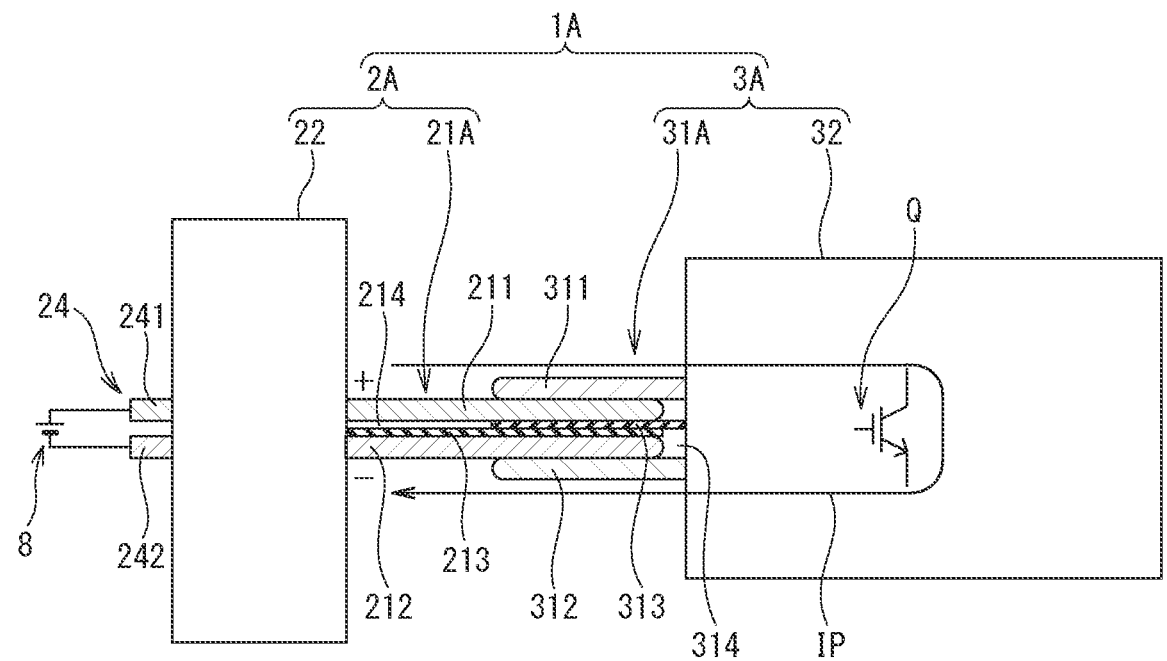

The electrode portion 24 includes a positive electrode side electrode 241 and a negative electrode side electrode 242 (see FIG. 3B). The positive electrode side electrode 241 is connected to a positive electrode side output terminal of the power supply device 8, and the negative electrode side electrode 242 is connected to a negative electrode side output terminal of the power supply device 8. Therefore, the capacitor 2A stores DC power in which the positive electrode terminal 211 side and the positive electrode side electrode 241 side are positive and the negative electrode terminal 212 side and the negative electrode side electrode 242 side are negative. Additionally, DC power in which the positive electrode terminal 211 side is positive and the negative electrode terminal 212 side is negative is supplied from the first bus bar 21A to the semiconductor module 3A.

As illustrated in FIG. 1, the positive electrode input terminal 311, the negative electrode input terminal 312, and the second insulating member 313 have a rectangular flat plate shape as viewed along the z direction. The positive electrode input terminal 311, the negative electrode input terminal 312, and the second insulating member 313 are arranged to be overlapped with each other as viewed along the z direction.

Returning to FIG. 2, the second insulating member 313 is arranged in the second gap 314 while being not in contact with either the positive electrode input terminal 311 or the negative electrode input terminal 312 but in contact with the first insulating member 213 in the fitting portion 11A (details are described later). Therefore, in the fitting portion 11A, insulation between the positive electrode input terminal 311 and the negative electrode input terminal 312 is ensured by an insulator having a laminated structure formed by laminating the first and second insulating members 213 and 313.

The power converter 1A has a structure in which the first bus bar 21A is inserted into the second gap 314 to fit the first bus bar 21A and the second bus bar 31A together. As a result, the fitting portion 11A where the first and second bus bars 21A and 31A are fitted together has a laminated structure in which the positive electrode input terminal 311, the positive electrode terminal 211, the second insulating member 313, the first insulating member 213, the negative electrode terminal 212, and the negative electrode input terminal 312 are laminated along the z direction.

As in the present embodiment, when the first bus bar 21A is inserted into the second gap 314 to fit the first bus bar 21A and the second bus bar 31A together, a length L314 of the second gap 314 is determined by a thickness L21A of the first bus bar 21A. When the first bus bar 21A is not inserted thereinto, the length L314 of the second gap 314 is maintained, for example, at a length slightly shorter than the length L21A of the first bus bar 21A. The positive electrode input terminal 311 and the negative electrode input terminal 312 have a predetermined elasticity. Therefore, when the first bus bar 21A is inserted into the second gap 314 to fit the first bus bar 21A and the second bus bar 31A together, the second bus bar 31A attempts to maintain the length L314 of the second gap 314 at an initial length, and thus applies force to a direction in which the positive electrode terminal 211 and the positive electrode input terminal 311 approach each other (i.e., the z direction). This increases adhesion strength of the positive electrode input terminal 311 to the positive electrode terminal 211 and adhesion strength of the negative electrode input terminal 312 to the negative electrode terminal 212. As a result, the power converter 1A can ensure adhesion strength and low contact resistance required to supply power between the positive electrode terminal 211 and the positive electrode input terminal 311 and between the negative electrode terminal 212 and the negative electrode input terminal 312 even without welding the positive electrode terminal 211 and the positive electrode input terminal 311 and even without welding the negative electrode terminal 212 and the negative electrode input terminal 312.

Although illustration is omitted, some of the plurality of switching elements Q (see FIG. 3B, in which FIG. 3B illustrates one switching element Q) sealed in the mold resin 32 of the semiconductor module 3A constitute upper arms of an inverter circuit and a converter circuit, and the rest of the plurality of switching elements Q constitutes lower arms of the inverter circuit and the converter circuit. The positive electrode input terminal 311 provided in the second bus bar 31A is connected to the switching elements Q constituting the upper arms via a wiring pattern, a bonding wire, and the like formed on a laminated substrate sealed in the mold resin 32 and mounted with the plurality of switching elements Q. On the other hand, the negative electrode input terminal 312 provided in the second bus bar 31A is connected to the switching elements Q constituting the lower arms via another wiring pattern, another bonding wire, and the like formed on the laminated substrate sealed in the mold resin 32.

Thus, the positive electrode side of DC power output from the capacitor 2A is supplied to the switching elements Q constituting the upper arms via the positive electrode terminal 211 provided in the first bus bar 21A of the capacitor 2A, the positive electrode input terminal 311 provided in the second bus bar 31A of the semiconductor module 3A, and the like. On the other hand, the negative electrode side of the DC power output from the capacitor 2A is supplied to the switching elements Q constituting the lower arms via the negative electrode terminal 212 provided in the first bus bar 21A of the capacitor 2A, the negative electrode input terminal 312 provided in the second bus bar 31A of the semiconductor module 3A, and the like. The plurality of switching elements Q repeats on/off operation in predetermined combinations and at predetermined timings by the controller provided in the semiconductor module 3A, and supplies drive power to, for example, a motor (not illustrated) connected to the semiconductor module 3A.

When, as in the present embodiment, the first bus bar 21A is inserted into the second gap 314 to fit the first bus bar 21A and the second bus bar 31A together, the positive electrode terminal 211 and the negative electrode terminal 212 have a length longer than that of the positive electrode input terminal 311 and the negative electrode input terminal 312 in a direction in which the capacitor 2A and the semiconductor module 3A face each other (i.e., the x direction). More specifically, as illustrated in FIG. 2, when a length L211 from an end face of the mold resin 22 from which the first bus bar 21A projects to a leading end portion of the first bus bar 21A is defined as a length of the positive and negative electrode terminals 211 and 212 and a length 311 from an end face of the mold resin 32 from which the second bus bar 31A projects to a leading end portion of the second bus bar 31A is defined as a length of the positive and negative electrode input terminals 311 and 312, the length L211 of the positive and negative electrode terminals 211 and 212 is longer than the length L311 of the positive and negative electrode input terminals 311 and 312. Although details are described later, parasitic inductance in bus bars can be reduced by increasing, of bus bars that are fitted together, the length of two terminals of the bus bar that has a shorter distance (i.e., gap) between the two terminals provided in the bus bar (the length L211 of the positive electrode terminal 211 and the negative electrode terminal 212 of the first bus bar 21A in the present embodiment) more than the length of two terminals of the bus bar that has a longer distance between the two terminals (the length L311 of the positive electrode input terminal 311 and the negative electrode input terminal 312 of the second bus bar 31A in the present embodiment).

(Operation and Effects of Power Converter)

Next, operation and effects of the power converter 1A according to the present embodiment are described using FIG. 3, with reference to FIGS. 1 and 2. FIG. 3A is a diagram for illustrating parasitic inductance generated in parallel conductors arranged to face each other. FIG. 3B is a diagram schematically illustrating a power supply path in the power converter 1A.

As illustrated in FIG. 3A, consider a circuit including an AD power supply 93, a conductor 91 having a flat plate shape connected to one output terminal of the AC power supply 93, a conductor 92 having a flat plate shape connected to an other output terminal of the AC power supply 93, and a resistor element 94 connected between the conductors 91 and 92. Here, the conductors 91 and 92 are arranged to face each other while maintaining a gap d. The AC power supply 93 is connected to one end portion of each of the conductors 91 and 92, and the resistor element 94 is connected to an other end portion of each of the conductors 91 and 92.

Accordingly, current output from the AC power supply 93 flows through the circuit with a current path of "the conductor 91→the resistor element 94→the conductor 92→the AC power supply 93" or "the conductor 92→the resistor element 94→the conductor 91→the AC power supply 93".

It is commonly known that in such a circuit, the inductance value of parasitic inductance formed by the parallel flat plate shaped conductor pair is proportional to each of a length of the conductor pair and a distance between the conductors. Therefore, in the circuit illustrated in FIG. 3A, a parasitic inductance proportional to each of a length L and the gap d is formed in the conductors 91 and 92. Thus, in order to reduce the inductance value of the parasitic inductance formed in the conductors 91 and 92, the length L may be shortened, the gap d may be narrowed, or the length L may be shortened and the gap d narrowed.

As illustrated in FIG. 3B, a current path IP formed between the capacitor 2A and the semiconductor module 3A in the power converter 1A is as follows: "the power supply device 8→the positive electrode side electrode 241 of the electrode portion 24→the positive electrode terminal 211 of the first bus bar 21A→the positive electrode input terminal 311 of the second bus bar 31A→the switching element Q→the negative electrode input terminal 312 of the second bus bar 31A→the negative electrode terminal 212 of the first bus bar 21A→the negative electrode side electrode 242 of the electrode portion 24→the power supply device 8". When a fitting state between the first bus bar 21A of the capacitor 2A and the second bus bar 31A of the semiconductor module 3A is compared with the circuit illustrated in FIG. 3A, the positive electrode terminal 211 and the positive electrode input terminal 311 correspond to the conductor 91, the negative electrode terminal 212 and the negative electrode input terminal 312 correspond to the conductor 92, and the gap d corresponds to the first gap 214 and the second gap 314.

A distance at which the capacitor 2A and the semiconductor module 3A can be brought closer to each other is limited by the structure of the power converter 1A. Therefore, even if a facing distance L1A (see FIG. 2) between the capacitor 2A and the semiconductor module 3A is shortened, the effect of reducing the inductance value of parasitic inductance formed in the first and second bus bars 21A and 31A may not be sufficient.

Accordingly, in the power converter 1A, the length L214 of the first gap 214 and the length L314 of the second gap 314 are shortened to reduce inductance values of parasitic inductances formed in the first and second bus bars 21A and 31A. Specifically, since the length L214 of the first gap 214 is shorter than the length L314 of the second gap 314, the inductance value of a parasitic inductance formed in the first bus bar 21A is smaller than that of a parasitic inductance formed in the second bus bar 31A. Additionally, the length L211 of the positive electrode terminal 211 and the negative electrode terminal 212 provided in the first bus bar 21A is longer than the length L311 of the positive electrode input terminal 311 and the negative electrode input terminal 312.

Therefore, the parasitic inductance having a smaller inductance value accounts for a higher percentage in the facing distance L1A. As a result, the inductance value of parasitic inductance generated between the capacitor 2A and the semiconductor module 3A becomes small. This allows the power converter 1A to reduce inductance in the current path IP.

(Modification)

Figure 4:
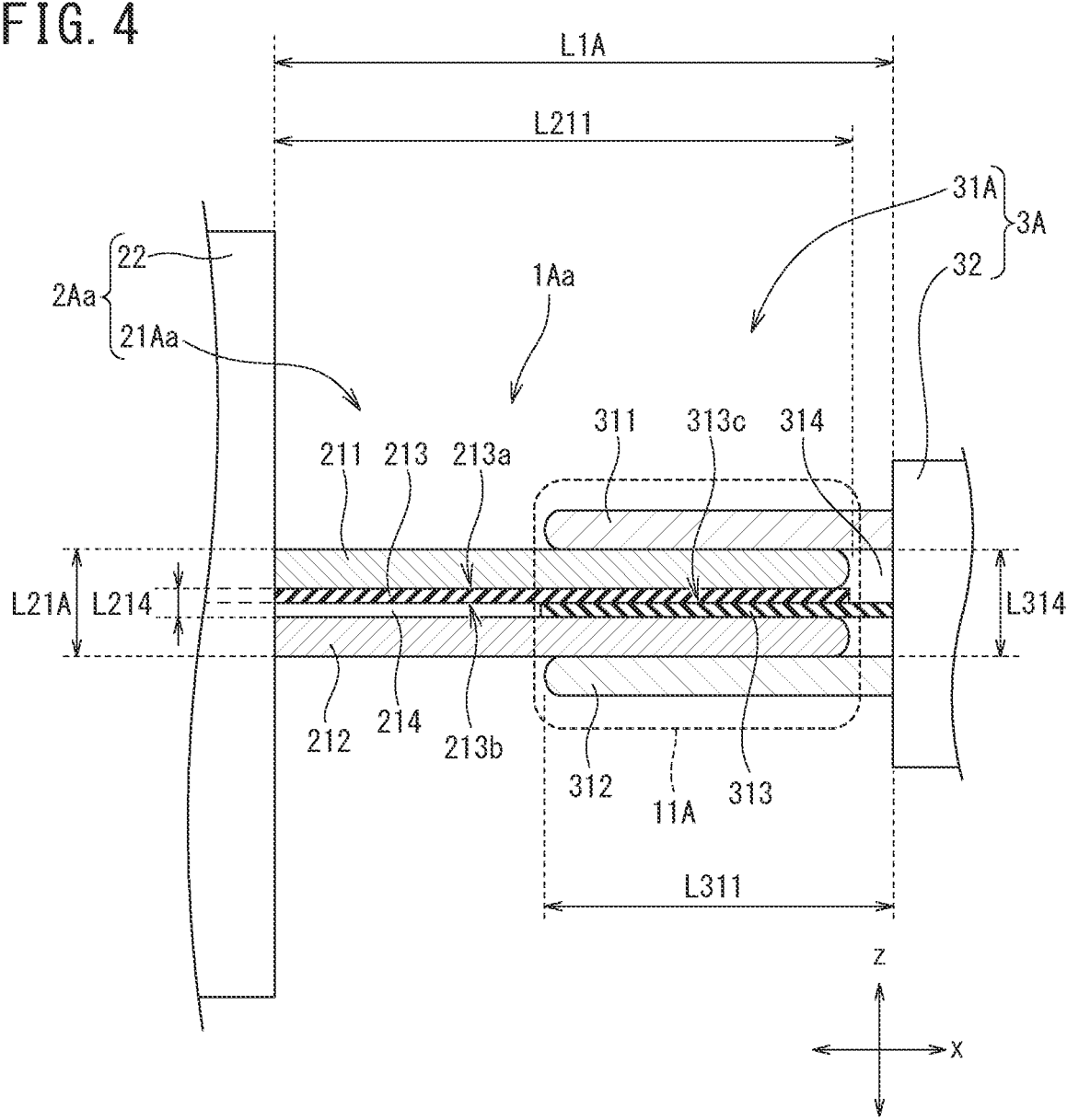
FIG. 4 is a schematic view illustrating an enlarged cross section in a vicinity of a fitting portion of a capacitor and a semiconductor module included in a power converter according to a modification of Embodiment 1 of the present invention.

A power converter 1Aa according to a modification of the present embodiment is described using FIG. 4. The power converter 1Aa according to the present modification has the same configuration as that of the power converter 1A according to the present embodiment except that the position of the first insulating member 213 is different. In the description of the power converter 1Aa according to the present modification, components that have the same operations and functions as those of the components of the power converter 1A according to the present embodiment are denoted by the same reference signs, and descriptions thereof are omitted. FIG. 4 is a schematic view illustrating an enlarged fitting portion of a capacitor 2Aa and the semiconductor module 3A included in the power converter 1Aa according to the present modification. In FIG. 4, for ease of understanding, a first bus bar 21Aa provided in the capacitor 2Aa and the second bus bar 31A provided in the semiconductor module 3A are illustrated in a cross section taken along the x direction through the center of the y direction.

As illustrated in FIG. 4, the power converter 1Aa according to the present modification includes the capacitor 2Aa including the first bus bar 21Aa that includes the positive electrode terminal 211, the negative electrode terminal 212 arranged to face the positive electrode terminal 211 with the first gap 214 provided therebetween, and the first insulating member 213 arranged in the first gap 214 and that is arranged in an exposed manner and the semiconductor module 3A including the second bus bar 31A that includes the positive electrode input terminal 311 overlapped with and connected to the positive electrode terminal 211, the negative electrode input terminal 312 arranged to face the positive electrode input terminal 311 with the second gap 314 and overlapped with and connected to the negative electrode terminal 212, and the second insulating member 313 arranged between the positive electrode input terminal 311 and the negative electrode input terminal 312 and including the contact surface 313c in contact with one of the front surface 213a or the back surface 213b of the first insulating member 213 and that is arranged in an exposed manner and fitted with the first bus bar 21Aa.

The first insulating member 213 in the power converter 1Aa is arranged in the first gap 214 in a state where the front surface 213a is attached and fixed to the positive electrode terminal 211 by, for example, an adhesive (not illustrated), and the back surface 213b is in contact with the contact surface 313c of the second insulating member 313.

Thus, even though the first insulating member 213 is arranged in contact with the positive electrode terminal 211, the first gap 214 has the length L214 shorter than the length L314 of the second gap 314, and the positive electrode terminal 211 and the negative electrode terminal 212 of the first bus bar 21Aa have the length L211 longer than the length L311 of the positive electrode input terminal 311 and the negative electrode input terminal 312 of the second bus bar 31A. Therefore, the power converter 1Aa according to the present modification can obtain the same effects as those of the power converter 1A according to the present embodiment.

As described above, the power converter 1A according to the present embodiment includes the capacitor 2A including the first bus bar 21A that includes the positive electrode terminal 211, the negative electrode terminal 212 arranged to face the positive electrode terminal 211 with the first gap 214, and the first insulating member 213 arranged in the first gap 214 and that is arranged in the exposed manner and the semiconductor module 3A including the second bus bar 31A that includes the positive electrode input terminal 311 overlapped with and connected to the positive electrode terminal 211, the negative electrode input terminal 312 arranged to face the positive electrode input terminal 311 with the second gap 314 and overlapped with and connected to the negative electrode terminal 212, and the second insulating member 313 arranged between the positive electrode input terminal 311 and the negative electrode input terminal 312 and including the contact surface 313c in contact with one of the front surface 213a or the back surface 213b of the first insulating member 213 and that is arranged in the exposed manner and fitted with the first bus bar 21A.

With the above configuration, the power converter 1A can reduce inductance, and also can prevent a manufacturing process from becoming complicated.

Embodiment 2

Figure 5:
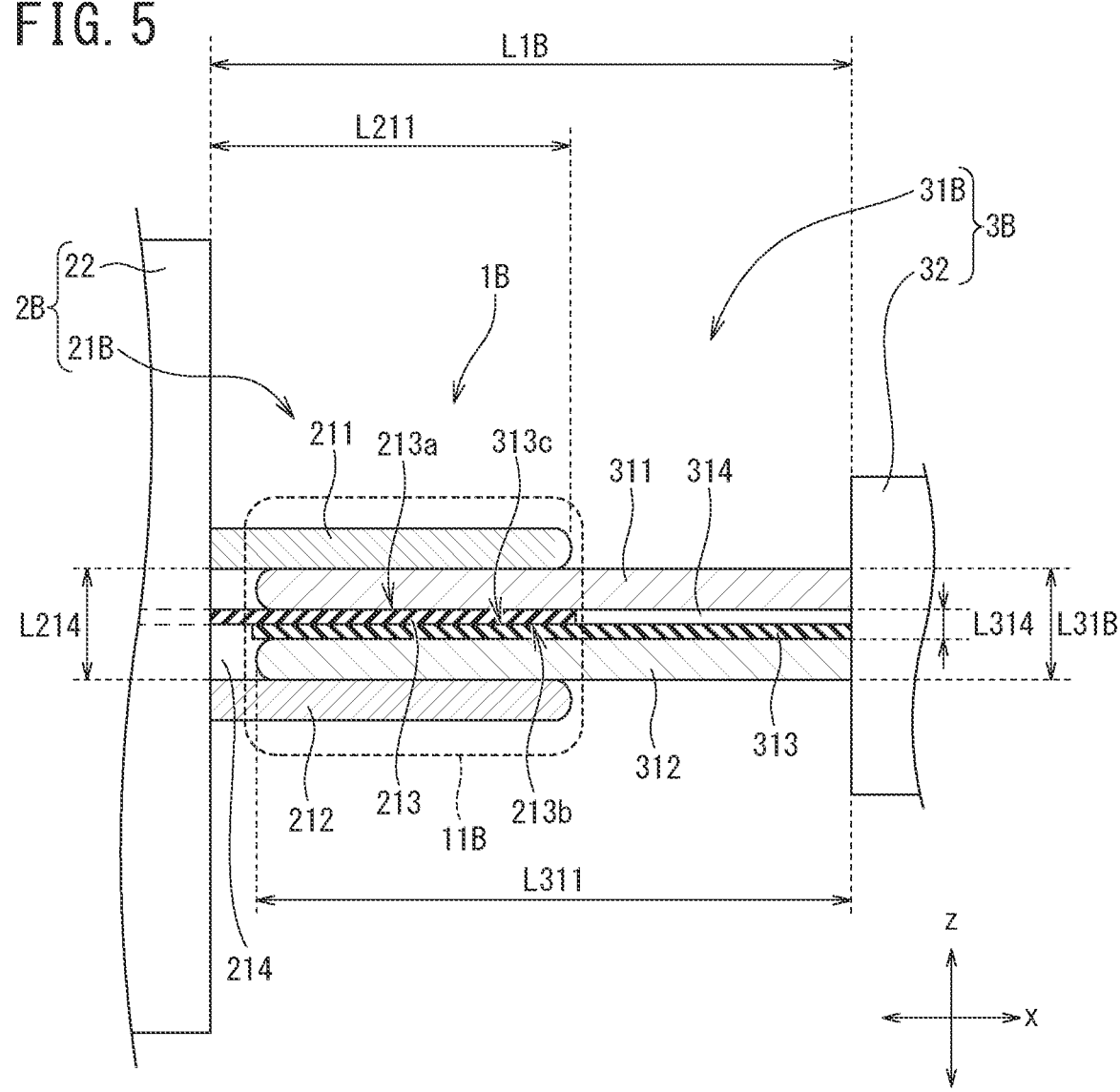
FIG. 5 is a schematic view illustrating an enlarged cross section in a vicinity of a fitting portion of a capacitor and a semiconductor module included in a power converter according to Embodiment 2 of the present invention.

A power converter according to Embodiment 2 of the present invention is described using FIG. 5. In the description of a power converter 1B according to the present embodiment, components that have the same operations and functions as those of the components of the power converter 1A according to Embodiment 1 above are denoted by the same reference signs, and descriptions thereof are omitted. FIG. 5 is a schematic view illustrating an enlarged vicinity of a fitting portion 11B of a capacitor 2B and a semiconductor module 3B included in the power converter 1B according to the present embodiment. In FIG. 5, for ease of understanding, a first bus bar 21B provided in the capacitor 2B and a second bus bar 31B provided in the semiconductor module 3B are illustrated in a cross section taken along the x direction through the center of the y direction (see FIG. 1).

As illustrated in FIG. 5, the power converter 1B according to the present embodiment includes the capacitor 2B including the first bus bar 21B that includes the positive electrode terminal 211, the negative electrode terminal 212 arranged to face the positive electrode terminal 211 with the first gap 214, and the first insulating member 213 arranged in the first gap 214 and that is arranged in an exposed manner and the semiconductor module 3B including the second bus bar 31B that includes the positive electrode input terminal 311 overlapped with and connected to the positive electrode terminal 211, the negative electrode input terminal 312 arranged to face the positive electrode input terminal 311 with the second gap 314 and overlapped with and connected to the negative electrode terminal 212, and the second insulating member 313 arranged between the positive electrode input terminal 311 and the negative electrode input terminal 312 and including the contact surface 313c in contact with one of the front surface 213a or the back surface 213b of the first insulating member 213 and that is arranged in an exposed manner and fitted with the first bus bar 21B. In the present embodiment, the contact surface 313c of the second insulating member 313 is in contact with the back surface 213b of the first insulating member 213.

The second insulating member 313 is arranged in contact with the negative electrode input terminal 312. The second insulating member 313 is attached and fixed to the negative electrode input terminal 312 by, for example, an adhesive (not illustrated). Alternatively, the second insulating member 313 may be attached and fixed to the negative electrode input terminal 312 by, for example, a conductive adhesive (not illustrated).

In the present embodiment and each of embodiments and modifications described below, when the second insulating member is attached to the negative electrode input terminal or the positive electrode input terminal by an insulating adhesive, the adhesive is considered to be a part of the second insulating member. Therefore, even when the second insulating member is attached to the negative electrode input terminal or the positive electrode input terminal by the adhesive, the second insulating member can be considered to be in contact with the negative electrode input terminal or the positive electrode input terminal. On the other hand, in the present embodiment and each of the embodiments and modifications described below, when the second insulating member is attached to the negative electrode input terminal or the positive electrode input terminal by a conductive adhesive, the adhesive is considered to be a part of the negative electrode input terminal or the positive electrode input terminal. Therefore, even when the second insulating member is attached to the negative electrode input terminal or the positive electrode input terminal by the adhesive, the second insulating member can be considered to be in contact with the negative electrode input terminal or the positive electrode input terminal.

The power converter 1B has a structure in which the second bus bar 31B is inserted into the first gap 214 to fit the first bus bar 21B and the second bus bar 31B together. As a result, the fitting portion 11B where the first and second bus bars 21B and 31B are fitted together has a laminated structure in which the positive electrode terminal 211, the positive electrode input terminal 311, the first insulating member 213, the second insulating member 313, the negative electrode input terminal 312, and the negative electrode terminal 212 are laminated along the z direction.

When, as in the present embodiment, the second bus bar 31B is inserted into the first gap 214 to fit the first bus bar 21B and the second bus bar 31B together, the length L214 of the first gap 214 is determined by a thickness L31B of the second bus bar 31B. When the second bus bar 31B is not inserted thereinto, the length L214 of the first gap 214 is maintained, for example, at a length slightly shorter than the length L31B of the second bus bar 31B. The positive electrode terminal 211 and the negative electrode terminal 212 have a predetermined elasticity. Therefore, when the second bus bar 31B is inserted into the first gap 214 to fit the first bus bar 21B and the second bus bar 31B together, the first bus bar 21B attempts to maintain the length L214 of the first gap 214 at an initial length, and thus applies force in the direction in which the positive electrode terminal 211 and the positive electrode input terminal 311 approach each other (i.e., the z direction). This improves adhesion strength of the positive electrode terminal 211 to the positive electrode input terminal 311 and adhesion strength of the negative electrode terminal 212 to the negative electrode input terminal 312. As a result, even without welding the positive electrode terminal 211 and the positive electrode input terminal 311 and even without welding the negative electrode terminal 212 and the negative electrode input terminal 312, the power converter 1B can ensure adhesion strength and low contact resistance required to supply power between the positive electrode terminal 211 and the positive electrode input terminal 311 and between the negative electrode terminal 212 and the negative electrode input terminal 312.

When, as in the present embodiment, the second bus bar 31B is inserted into the first gap 214 to fit the first bus bar 21B and the second bus bar 31B together, the positive electrode terminal 211 and the negative electrode terminal 212 have a length shorter than that of the positive electrode input terminal 311 and the negative electrode input terminal 312 in a facing direction in which the capacitor 2B and the semiconductor module 3B face each other (i.e., the x direction). More specifically, as illustrated in FIG. 5, when the length L211 from an end face of the mold resin 22 from which the first bus bar 21B projects to a leading end portion of the first bus bar 21B is defined as the length of the positive electrode terminal 211 and the negative electrode terminal 212 and the length L311 from an end face of the mold resin 32 from which the second bus bar 31B projects to a leading end portion of the second bus bar 31B is defined as the length of the positive electrode input terminal 311 and the negative electrode input terminal 312, the length L211 of the positive electrode terminal 211 and the negative electrode terminal 212 is shorter than the length L311 of the positive electrode input terminal 311 and the negative electrode input terminal 312.

Thus, in the power converter 1B, since the length L314 of the second gap 314 is shorter than the length L214 of the first gap 214, the inductance value of a parasitic inductance formed in the second bus bar 31B is smaller than the inductance value of a parasitic inductance formed in the first bus bar 21B. Additionally, the length L311 of the positive electrode input terminal 311 and the negative electrode input terminal 312 provided in the second bus bar 31B is longer than the length L211 of the positive electrode terminal 211 and the negative electrode terminal 212. Therefore, the parasitic inductance having a smaller inductance value accounts for a higher percentage in a facing distance L1B in which the capacitor 2B and the semiconductor module 3B face each other. This reduces the inductance value of parasitic inductance generated between the capacitor 2B and the semiconductor module 3B. As a result, the power converter 1B can reduce inductance in a current path formed between the capacitor 2B and the semiconductor module 3B (see the current path IP illustrated in FIG. 3B).

As described above, the power converter 1B according to the present embodiment can obtain the same effects as those of the power converter 1A according to Embodiment 1 above even with the structure in which the second bus bar 31B is inserted into the first gap 214 provided in the first bus bar 21B to fit the first bus bar 21B and the second bus bar 31B together.

Although illustration is omitted, even when, in the power converter 1B according to the present embodiment, the second insulating member 313 is arranged in contact with the positive electrode input terminal 311 and is in contact with the front surface 213a of the first insulating member 213, the same effects as those of the power converter 1B according to the present embodiment can be obtained, similarly to the relationship between the power converter 1A according to Embodiment 1 above and the power converter 1Aa according to the modification of Embodiment 1 above.

Embodiment 3

Figure 6:
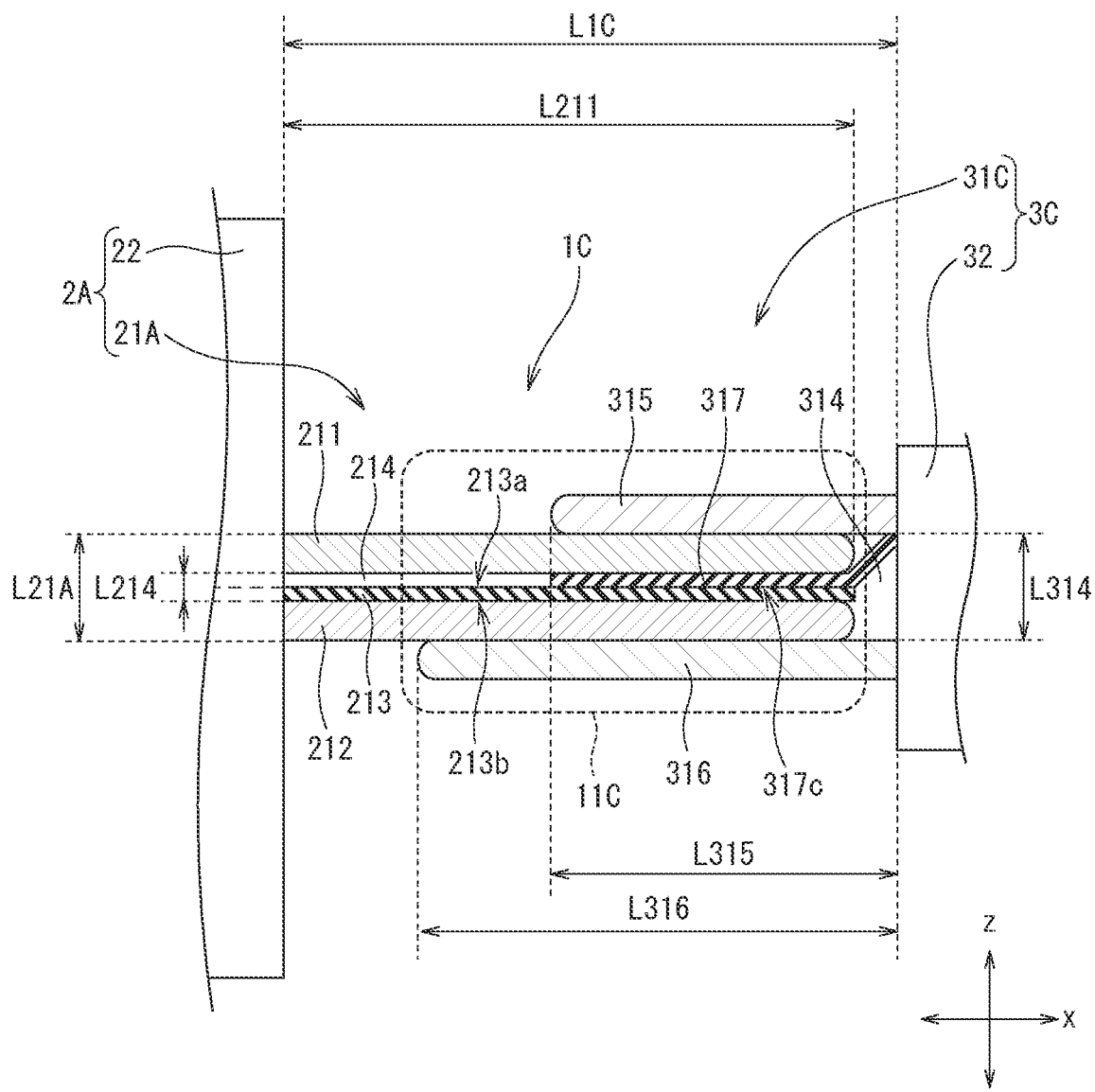
FIG. 6 is a schematic view illustrating an enlarged cross section in a vicinity of a fitting portion of a capacitor and a semiconductor module included in a power converter according to Embodiment 3 of the present invention.

A power converter according to Embodiment 3 of the present invention is described using FIGS. 6 and 7. In the description of a power converter 1C according to the present embodiment, components that have the same operations and functions as those of the components of the power converter 1A according to Embodiment 1 above are denoted by the same reference signs, and descriptions thereof are omitted. FIG. 6 is a schematic view illustrating an enlarged vicinity of a fitting portion 11C of the capacitor 2A and a semiconductor module 3C included in the power converter 1C according to the present embodiment. In FIG. 6, for ease of understanding, the first bus bar 21A provided in the capacitor 2A and a second bus bar 31C provided in the semiconductor module 3C are illustrated in a cross section taken along the x direction through the center of the y direction (see FIG. 1).

As illustrated in FIG. 6, the power converter 1C according to the present embodiment includes the capacitor 2A including the first bus bar 21A that includes the positive electrode terminal 211, the negative electrode terminal 212 arranged to face the positive electrode terminal 211 with the first gap 214, and the first insulating member 213 arranged in the first gap 214 and that is arranged in an exposed manner and the semiconductor module 3C including the second bus bar 31C that includes a positive electrode input terminal 315 overlapped with and connected to the positive electrode terminal 211, a negative electrode input terminal 316 arranged to face the positive electrode input terminal 315 with the second gap 314 and overlapped with and connected to the negative electrode terminal 212, and a second insulating member 317 arranged between the positive electrode input terminal 315 and the negative electrode input terminal 316 and including a contact surface 317c in contact with one of the front surface 213a or the back surface 213b of the first insulating member 213 and that is arranged in an exposed manner and fixed with the first bus bar 21A. In the present embodiment, the contact surface 317c is in contact with the front surface 213a of the first insulating member 213. The first bus bar 21A in the present embodiment has the same structure as that of the first bus bar 21A in Embodiment 1 above, and is adapted to exhibit the same function as that thereof.

The positive electrode input terminal 315 and the negative electrode input terminal 316 are made of a conductive material (e.g., copper). The positive electrode input terminal 315 may be made of the same material as that of the positive electrode terminal 211, and the negative electrode input terminal 316 may be made of the same material as that of the negative electrode terminal 212. This reduces contact resistance between the positive electrode input terminal 315 and the positive electrode terminal 211 and contact resistance between the negative electrode input terminal 316 and the negative electrode terminal 212. The second insulating member 317 may be made of an insulating material (e.g., a material containing glass epoxy resin) or may be composed of, for example, insulating paper.

The positive electrode input terminal 315, the negative electrode input terminal 316, and the second insulating member 317 have a rectangular flat plate shape as viewed along the z direction, similarly to the positive electrode input terminal 311, the negative electrode input terminal 312, and the second insulating member 313 in Embodiment 1 above. The positive electrode input terminal 315, the negative electrode input terminal 316, and the second insulating member 317 are arranged to be overlapped with each other as viewed along the z direction.

In the fitting portion 11C, the second insulating member 317 is arranged in the second gap 314 while being not in contact with either the positive electrode input terminal 315 or the negative electrode input terminal 316 but in contact with the first insulating member 213. Accordingly, in the fitting portion 11C, insulation between the positive electrode input terminal 315 and the negative electrode input terminal 316 is ensured by an insulator having a laminated structure formed by laminating the first and second insulating members 213 and 317.

The power converter 1C has a structure in which the first bus bar 21A is inserted into the second gap 314 to fit the first bus bar 21A and the second bus bar 31C together. As a result, the fitting portion 11C where the first and second bus bars 21A and 31C are fitted together has a laminated structure in which the positive electrode input terminal 315, the positive electrode terminal 211, the second insulating member 317, the first insulating member 213, the negative electrode terminal 212, and the negative electrode input terminal 316 are laminated along the z direction.

When, in the present embodiment as in Embodiment 1 above, the first bus bar 21A is inserted into the second gap 314 to fit the first and second bus bars 21A and 31C together, the thickness L314 of the second gap 314 is determined by a length L21A of the first bus bar 21A. When the first bus bar 21A is not inserted thereinto, the length L314 of the second gap 314 is maintained, for example, at a length slightly shorter than the length L21A of the first bus bar 21A. Similarly to Embodiment 1 above, this allows the power converter 1C according to the present embodiment to ensure adhesion strength and low contact resistance required to supply power between the positive electrode terminal 211 and the positive electrode input terminal 315 and between the negative electrode terminal 212 and the negative electrode input terminal 316 even without welding the positive electrode terminal 211 and the positive electrode input terminal 315 and even without welding the negative electrode terminal 212 and the negative electrode input terminal 316.

Although illustration is omitted, a plurality of switching elements Q (not illustrated; see the switching element Q illustrated in FIG. 3B) having the same configuration as those of the semiconductor module 3A in Embodiment 1 above is provided in the mold resin 32 of the semiconductor module 3C. Therefore, the positive electrode input terminal 315 provided in the second bus bar 31C is connected to switching elements Q sealed in the mold resin 32 and constituting upper arms, and the negative electrode input terminal 316 provided in the second bus bar 31C is connected to switching elements Q sealed in the mold resin 32 and constituting lower arms.

By doing this, the positive electrode side of DC power output from the capacitor 2A is supplied to the switching elements Q constituting the upper arms via the positive electrode terminal 211 provided in the first bus bar 21A of the capacitor 2A, the positive electrode input terminal 315 provided in the second bus bar 31C of the semiconductor module 3C, and the like. On the other hand, the negative electrode side of the DC power output from the capacitor 2A is supplied to the switching elements Q constituting the lower arms via the negative electrode terminal 212 provided in the first bus bar 21A of the capacitor 2A, the negative electrode input terminal 316 provided in the second bus bar 31C of the semiconductor module 3C, and the like. These switching elements Q repeat on/off operation in predetermined combinations and at predetermined timings by a controller provided in the semiconductor module 3C, and supply drive power to, for example, a motor (not illustrated) connected to the semiconductor module 3C.

When, as in the present embodiment, the first bus bar 21A is inserted into the second gap 314 to fit the first and second bus bars 21A and 31C together, the positive electrode terminal 211 and the negative electrode terminal 212 have different lengths from each other in a facing direction in which the capacitor 2A and the semiconductor module 3C face each other (i.e., the x direction). More specifically, as illustrated in FIG. 6, a length L315 from an end face of the mold region 32 from which the second bus bar 31c projects to a leading end portion of the second bus bar 31c is defined as a length of the positive electrode input terminal 311 and a length L316 from the end face to the leading end portion of the second bus bar 31C is defined as a length of the negative electrode input terminal 316, the length L315 of the positive electrode input terminal 315 is different from the length L316 of the negative electrode input terminal 316. The length L315 of the positive electrode input terminal 315 is shorter than the length L316 of the negative electrode input terminal 316.

Additionally, when, as in the power converter 1C, the first bus bar 21A is inserted into the second gap 314 to fit the first and second bus bars 21A and 31C together, the second insulating member 317 is in contact with, of the positive and negative electrode input terminals 315 and 316, a terminal having a shorter length in the facing direction in which the capacitor 2A and the semiconductor module 3C face each other (in order words, the x direction), and the first insulating member 213 is in contact with, of the positive and negative electrode terminals 211 and 212, a terminal opposite in polarity to the terminal in contact with the second insulating member 317. Specifically, as illustrated in FIG. 6, in the power converter 1C, the second insulating member 317 is arranged in close contact with the positive electrode input terminal 315 of the positive and negative electrode input terminals 315 and 316, and the first insulating member 213 is arranged in close contact with the negative electrode terminal 212 opposite in polarity to the positive electrode input terminal 315.

Thus, the second bus bar 31C on the side into which the first bus bar 21A is inserted includes the positive and negative electrode input terminals 315 and 316 being unequal in length, the second insulating member 317 is in contact with the positive electrode input terminal 315, which is the one shorter in length of the positive and negative electrode input terminals 315 and 316, and the first insulating member 213 provided in the first bus bar 21A is arranged in contact with the negative electrode terminal 212 opposite in polarity to the positive electrode input terminal 315. This configuration facilitates a process for joining the first and second bus bars 21A and 31C.

Figure 7A:
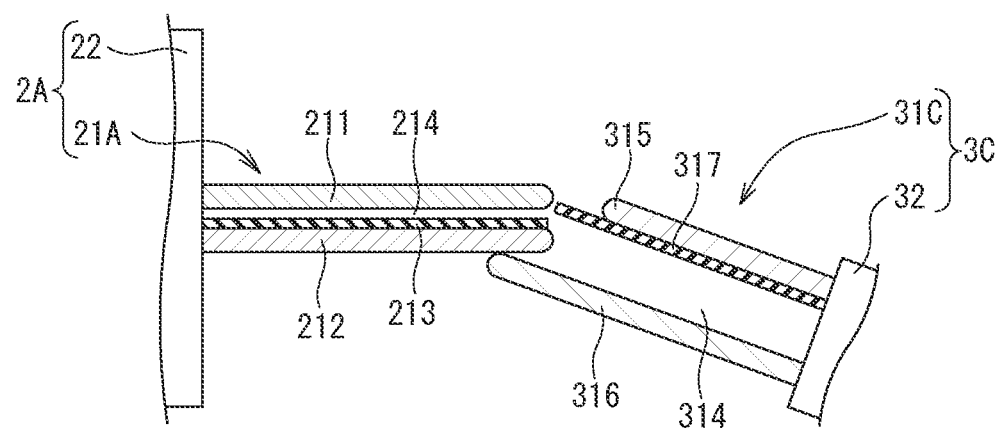
FIGS. 7A and B are diagrams schematically illustrating a method for joining the capacitor and the semiconductor module included in the power converter according to Embodiment 3 of the present invention.
Figure 7B:
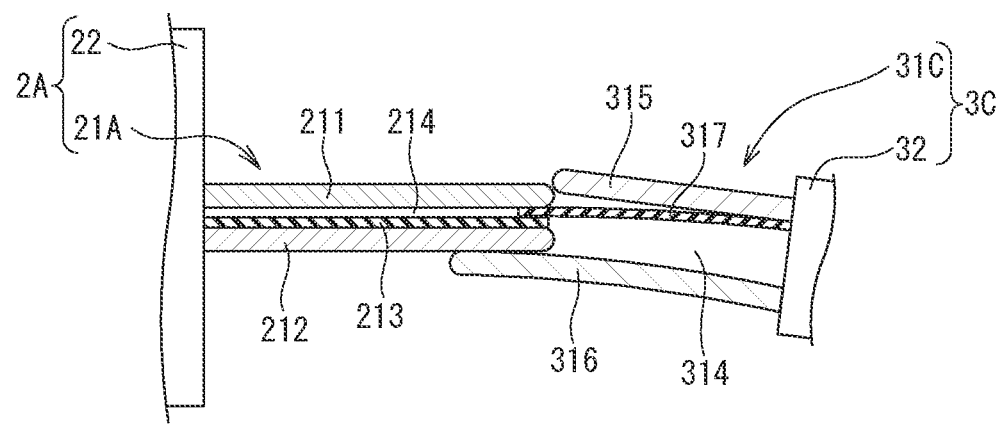

Here, the process for joining the first and second bus bars 21A and 31C is described using FIG. 7. FIG. 7A schematically illustrates the first and second bus bars 21A and 31C before being joined, and FIG. 7B schematically illustrates the first bus bar 21A in the middle of being inserted into the second gap 314 of the second bus bar 31C.

As illustrated in FIG. 7A, the second insulating member 317 provided in the second bus bar 31C has a length longer than the positive electrode input terminal 315. Then, when joining the first and second bus bars 21A and 31C, for example, the semiconductor module 3C is pushed against the capacitor 2A from diagonally below the capacitor 2A.

As illustrated in FIG. 7B, when the semiconductor module 3C continues to be further pushed toward the capacitor 2A side, the negative electrode input terminal 316 is elastically deformed convexly toward the positive electrode input terminal 315 side, and a protrusion of the second insulating member 317 is inserted into the first gap 214 of the first bus bar 21A. Furthermore, by continuing to push the semiconductor module 3C toward the capacitor 2A side, the second insulating member 317 serves as a guiding member to fit the first and second bus bars 21A and 31C together.

Thus, in the power converter 1C, the first and second bus bars 21A and 31C can be easily joined even when it is structurally difficult to ensure sufficient clearance for the first and second bus bars 21A and 31C to join together.

Returning to FIG. 6, the positive electrode terminal 211 and the negative electrode terminal 212 provided in the first bus bar 21A have the length L211 longer than both the length L315 of the positive electrode input terminal 315 and the length L316 of the negative electrode input terminal 316. Thus, in the power converter 1C, since the length L214 of the first gap 214 is shorter than the length L314 of the second gap 314, the inductance value of a parasitic inductance formed in the first bus bar 21A is smaller than the inductance value of a parasitic inductance formed in the second bus bar 31C. Additionally, the length L211 of the positive electrode terminal 211 and the negative electrode terminal 212 provided in the first bus bar 21A is longer than the length L315 of the positive electrode input terminal 315 and the length L316 of the negative electrode input terminal 316. Therefore, the parasitic inductance having a smaller inductance value accounts for a higher percentage in a facing distance L1C in which the capacitor 2A and the semiconductor module 3C face each other. Thus, the inductance value of parasitic inductance generated between the capacitor 2A and the semiconductor module 3C is small. As a result, the power converter 1C can reduce inductance in a current path formed between the capacitor 2A and the semiconductor module 3C (see the current path IP illustrated in FIG. 3B).

As described above, the power converter 1C according to the present embodiment has the structure in which the first bus bar 21A is inserted into the second gap 314 provided in the second bus bar 31C to fit the first and second bus bars 21A and 31C together. Additionally, the positive electrode terminal 211 and the negative electrode terminal 212 provided in the first bus bar 21A have the longer length than the positive electrode input terminal 315 and the negative electrode input terminal 316 provided in the second bus bar 31C. This allows the power converter 1C according to the present embodiment to obtain the same effects as those of the power converter 1A according to Embodiment 1 above.

Furthermore, in the power converter 1C, the positive electrode input terminal 315 and the negative electrode input terminal 316 have the different lengths from each other. Therefore, the power converter 1C facilitates the process for joining the first and second bus bars 21A and 31C.

Although illustration is omitted, in the power converter 1C according to the present embodiment, the positive electrode input terminal 315 may have a length longer than the negative electrode input terminal 316, the second insulating member 317 may be provided in contact with the negative electrode input terminal 316, the first insulating member 213 may be provided in contact with the positive electrode terminal 211, and the positive electrode terminal 211 and the negative electrode terminal 212 may have a length longer than the positive electrode input terminal 315 and the negative electrode input terminal 316. Even with such a configuration, the power converter 1C can obtain the same effects as those of the power converter 1C according to the present embodiment.

Embodiment 4

Figure 8:
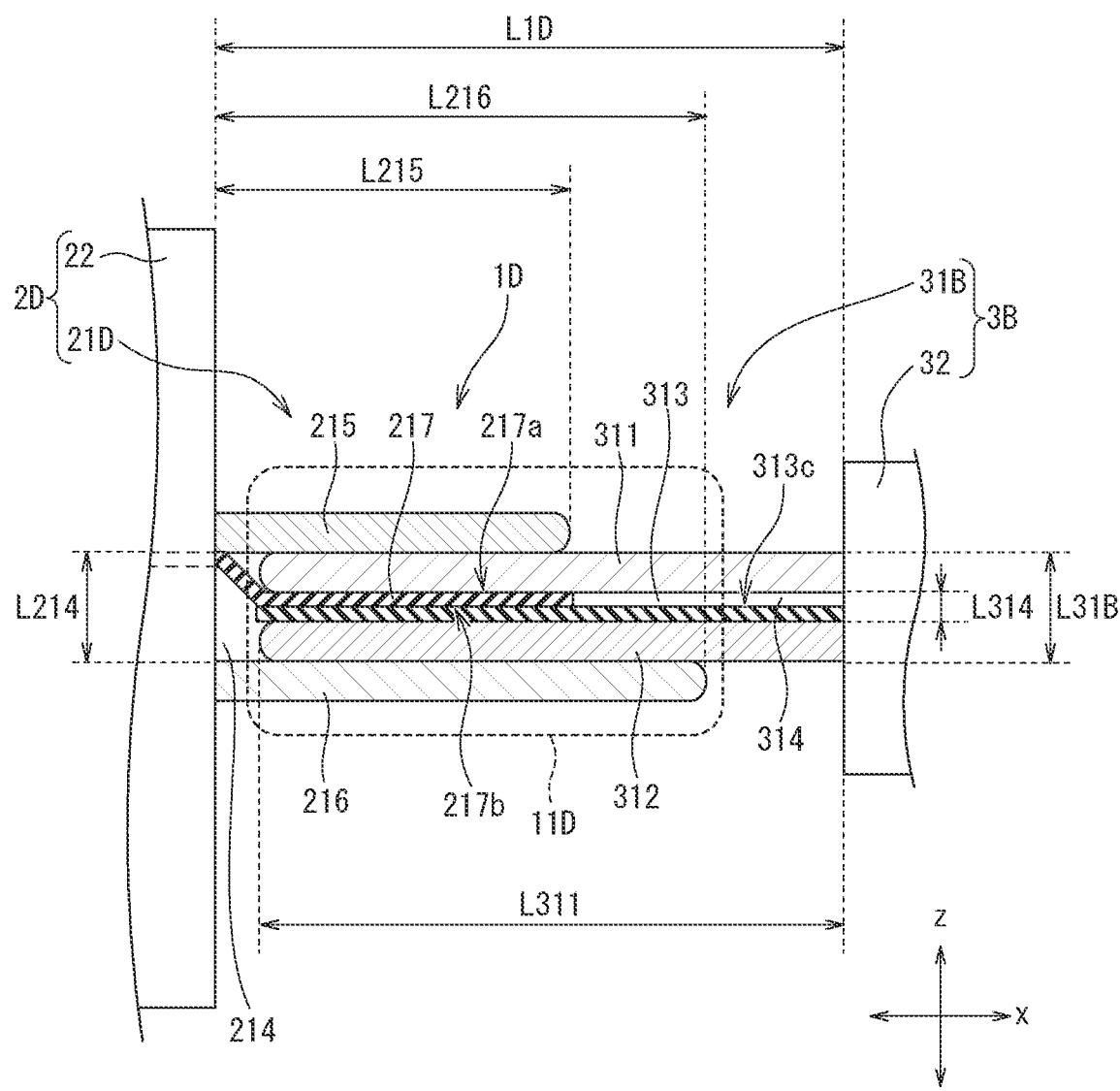
FIG. 8 is a schematic view illustrating an enlarged cross section in a vicinity of a fitting portion of a capacitor and a semiconductor module included in a power converter according to Embodiment 4 of the present invention.

A power converter according to Embodiment 4 of the present invention is described using FIG. 8. In the description of a power converter 1D according to the present embodiment, components that have the same operations and functions as those of the components of the power converter 1B according to Embodiment 2 above are denoted by the same reference signs, and descriptions thereof are omitted. FIG. 8 is a schematic view of an enlarged vicinity of a fitting portion 11D of the capacitor 2D and the semiconductor module 3B included in the power converter 1D according to the present embodiment. In FIG. 8, for ease of understanding, a first bus bar 21D provided in the capacitor 2D and the second bus bar 31B provided in the semiconductor module 3B are illustrated in a cross section taken along the x direction through the center of the y direction (see FIG. 1).

As illustrated in FIG. 8, the power converter 1D according to the present embodiment includes the capacitor 2D including the first bus bar 21D that includes a positive electrode terminal 215, a negative electrode terminal 216 arranged to face the positive electrode terminal 215 with the first gap 214, and a first insulating member 217 arranged in the first gap 214 and that is arranged in an exposed manner and the semiconductor module 3B including the second bus bar 31B that includes the positive electrode input terminal 311 overlapped with and connected to the positive electrode terminal 215, the negative electrode input terminal 312 arranged to face the positive electrode input terminal 311 with the second gap 314 and overlapped with and connected to the negative electrode terminal 216, and the second insulating member 313 arranged between the positive electrode input terminal 311 and the negative electrode input terminal 312 and including the contact surface 313c in contact with one of a front surface 217a or a back surface 217b of the first insulating member 217 and that is arranged in an exposed manner and fitted with the first bus bar 21D. In the present embodiment, the contact surface 313c of the second insulating member 313 is in contact with the back surface 217b of the first insulating member 217.

The positive electrode terminal 215 and the negative electrode terminal 216 are made of a conductive material (e.g., copper). The first insulating member 217 may be made of an insulating material (e.g., a material containing glass epoxy resin) or may be composed of, for example, insulating paper.

The positive electrode terminal 215 is electrically connected to the positive electrode side electrode 241. The positive electrode terminal 215 and the positive electrode side electrode 241 are made of, for example, the same conductive material. The negative electrode terminal 216 is electrically connected to the negative electrode side electrode 242. The negative electrode terminal 216 and the negative electrode side electrode 242 are made of, for example, the same conductive material. The first insulating member 217 is arranged to extend from the first gap 214 side into the mold resin 22.

The positive electrode terminal 215, the negative electrode terminal 216, and the first insulating member 217 have a rectangular flat plate shape as viewed along the z direction, similarly to the positive electrode terminal 211, the negative electrode terminal 212, and the first insulating member 213 in Embodiment 1 above. The positive electrode terminal 215, the negative electrode terminal 216, and the first insulating member 217 are arranged to be overlapped with each other as viewed along the z direction.

In the fitting portion 11D, the first insulating member 217 is arranged in the second gap 314 while being not in contact with either the positive electrode terminal 215 or the negative electrode terminal 216 but in contact with the second insulating member 313. Accordingly, in the fitting portion 11D, insulation between the positive and negative electrode terminals 215 and 216 are ensured by an insulator having a laminated structure formed by laminating the first and second insulating members 217 and 313.

The power converter 1D has a structure in which the second bus bar 31B is inserted into the first gap 214 to fit the first and second bus bars 21D and 31B together. With this structure, the fitting portion 11D where the first and second bus bars 21D and 31B are fitted together has a laminated structure in which the positive electrode terminal 215, the positive electrode input terminal 311, the first insulating member 217, the second insulating member 313, the negative electrode input terminal 312, and the negative electrode terminal 216 are laminated along the z direction.

When, in the present embodiment as in Embodiment 2 above, the second bus bar 31B is inserted into the first gap 214 to fit the first and second bus bars 21D and 31B together, the length L214 of the first gap 214 is determined by the thickness L31B of the second bus bar 31B. When the second bus bar 31B is not inserted thereinto, the length L214 of the first gap 214 is maintained, for example, at a length slightly shorter than the length L31B of the second bus bar 31B. Similarly to Embodiment 2 above, this allows the power converter 1D according to the present embodiment to ensure adhesion strength and low contact resistance required to supply power between the positive electrode terminal 215 and the positive electrode input terminal 311 and between the negative electrode terminal 216 and the negative electrode input terminal 312 even without welding the positive electrode terminal 215 and the positive electrode input terminal 311 and even without welding the negative electrode terminal 216 and the negative electrode input terminal 312.

When, as in the present embodiment, the second bus bar 31B is inserted into the first gap 214 to fit the first and second bus bars 21D and 31B together, the positive electrode terminal 215 and the negative electrode terminal 216 have lengths different from each other in a facing direction in which the capacitor 2D and the semiconductor module 3B face each other (i.e., the x direction). More specifically, as illustrated in FIG. 8, when a length L215 from an end face of the mold resin 22 from which the first bus bar 21D projects to a leading end portion of the first bus bar 21D is defined as the length of the positive electrode terminal 211 and a length L216 from the end face to the leading end portion of the first bus bar 21D is defined as the length of the negative electrode terminal 216, the length L215 of the positive electrode terminal 215 is different from the length L216 of the negative electrode terminal 216. The length L215 of the positive electrode terminal 215 is shorter than the length L216 of the negative electrode terminal 216.

Furthermore, when, as in the power converter 1B, the second bus bar 31B is inserted into the first gap 214 to fit the first and second bus bars 21D and 31B together, the first insulating member 217 is in contact with, of the positive and negative electrode terminals 215 and 216, a terminal having a shorter length in a facing direction in which the capacitor 2D and the semiconductor module 3B face each other (in order words, the x direction), and the second insulating member 313 is in contact with, of the positive and negative electrode input terminals 311 and 312, a terminal opposite in polarity to the terminal in contact with the first insulating member 217. Specifically, as illustrated in FIG. 8, in the power converter 1D, the first insulating member 217 is arranged in close contact with the positive electrode terminal 215 of the positive and negative electrode terminals 215 and 216, and the second insulating member 313 is arranged in close contact with the negative electrode input terminal 312 opposite in polarity to the positive electrode terminal 215.

Thus, the first bus bar 21D on the side where the second bus bar 31B is inserted includes the positive and negative electrode terminals 215 and 216 being unequal in length, the first insulating member 217 is in contact with the positive electrode terminal 215, which is the one shorter in length of the positive and negative electrode terminals 215 and 216, and the second insulating member 313 provided in the second bus bar 31B is arranged in contact with the negative electrode input terminal 312 opposite in polarity to the positive electrode terminal 215. This facilitates the process for joining the first and second bus bars 21D and 31B, similarly to Embodiment 3 above.

In other words, when joining the first and second bus bars 21D and 31B, for example, the capacitor 2D continues to be pushed toward the semiconductor module 3B side while pushing the capacitor 2D against the semiconductor module 3B from diagonally below the semiconductor module 3B. This causes the negative electrode terminal 216 to elastically deform convexly toward the positive electrode terminal 215 side, and causes a protruding portion of the first insulating member 217 to be inserted into the second gap 314 of the second bus bar 31B. Additionally, by continuing to push the capacitor 2D toward the semiconductor module 3C side, the first insulating member 217 serves as a guiding member to fit the first and second bus bars 21D and 31B together. Thus, similarly to the power converter 1C according to Embodiment 3 above, the power converter 1D can facilitate joining of the first and second bus bars 21D and 31B even when it is difficult to ensure sufficient clearance for joining of the first and second bus bars 21D and 31B.

In the power converter 1D, since the length L314 of the second gap 314 is shorter than the length L214 of the first gap 214, the inductance value of a parasitic inductance formed in the second bus bar 31B is smaller than the inductance value of a parasitic inductance formed in the first bus bar 21D. Additionally, the length L311 of the positive electrode input terminal 311 and the negative electrode input terminal 312 provided in the second bus bar 31B is longer than the length L215 of the positive electrode terminal 215 and the length L216 of the negative electrode terminal 216. Therefore, the parasitic inductance having a smaller inductance value accounts for a higher percentage in a facing distance LID in which the capacitor 2D and the semiconductor module 3B face each other. Thus, the inductance value of parasitic inductance generated between the capacitor 2D and the semiconductor module 3B is small. As a result, the power converter 1D can reduce inductance in a current path formed between the capacitor 2D and the semiconductor module 3B (see the current path IP illustrated in FIG. 3B).

As described above, the power converter 1D according to the present embodiment can obtain the same effects as those of the power converter 1B according to Embodiment 2 above and the power converter 1C according to Embodiment 3 above even with the structure in which the second bus bar 31B is inserted into the first gap 214 provided in the first bus bar 21D to fit the first and second bus bars 21D and 31B together.

Although illustration is omitted, in the power converter 1D according to the present embodiment, the positive electrode terminal 215 may have a length longer than the negative electrode terminal 216, the first insulating member 217 may be provided in contact with the negative electrode terminal 216, the second insulating member 313 may be provided in contact with the positive electrode input terminal 311, and the positive electrode input terminal 311 and the negative electrode input terminal 312 may have a length shorter than the positive electrode terminal 215 and the negative electrode terminal 216. Even with such a configuration, the power converter 1D can obtain the same effects as those of the power converter 1D according to the present embodiment.

Embodiment 5

Figure 9:
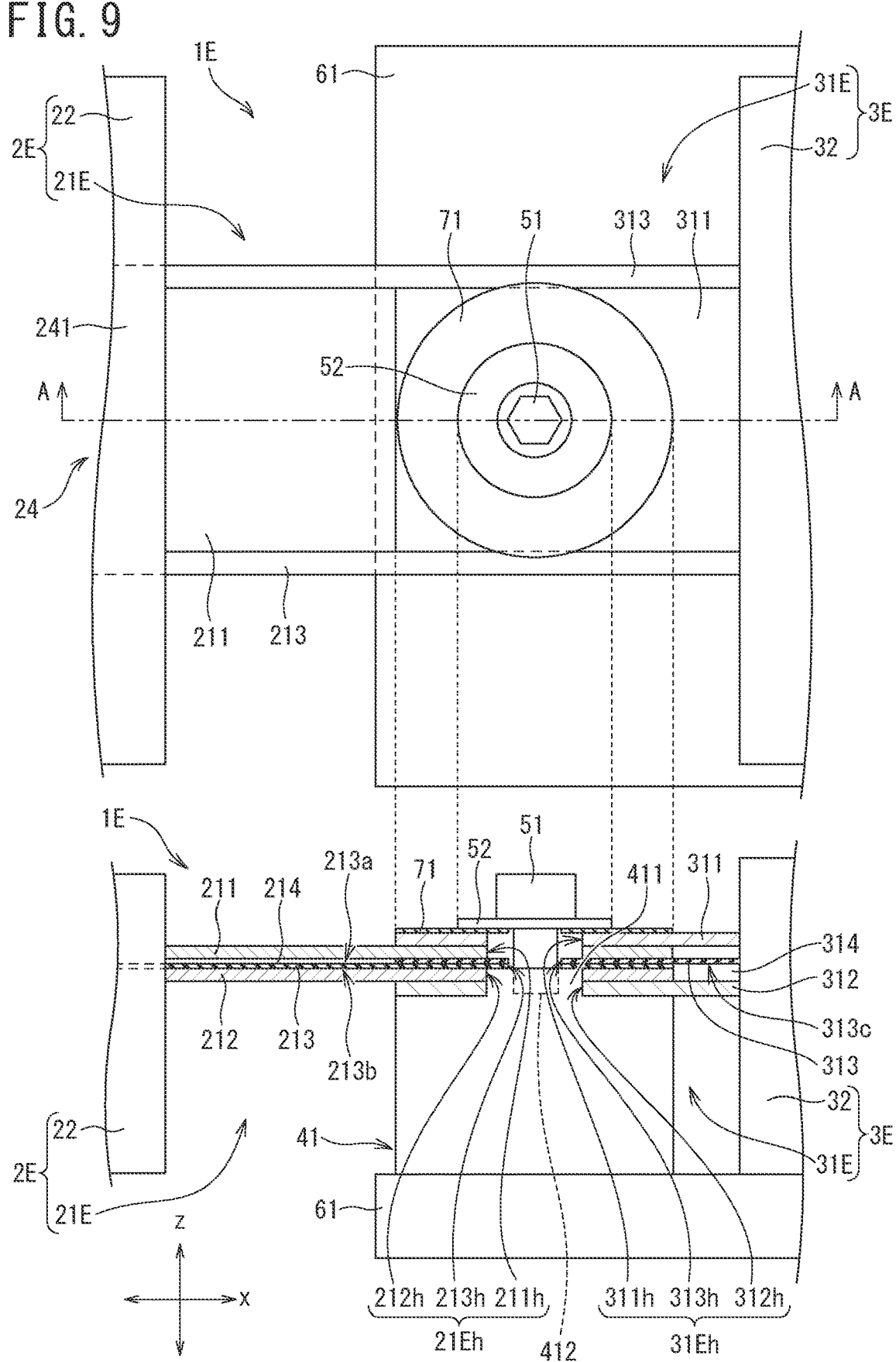
FIG. 9 is a schematic view illustrating an enlarged plan and an enlarged cross section in a vicinity of a fitting portion of a capacitor and a semiconductor module included in a power converter according to Embodiment 5 of the present invention.
Figure 10:
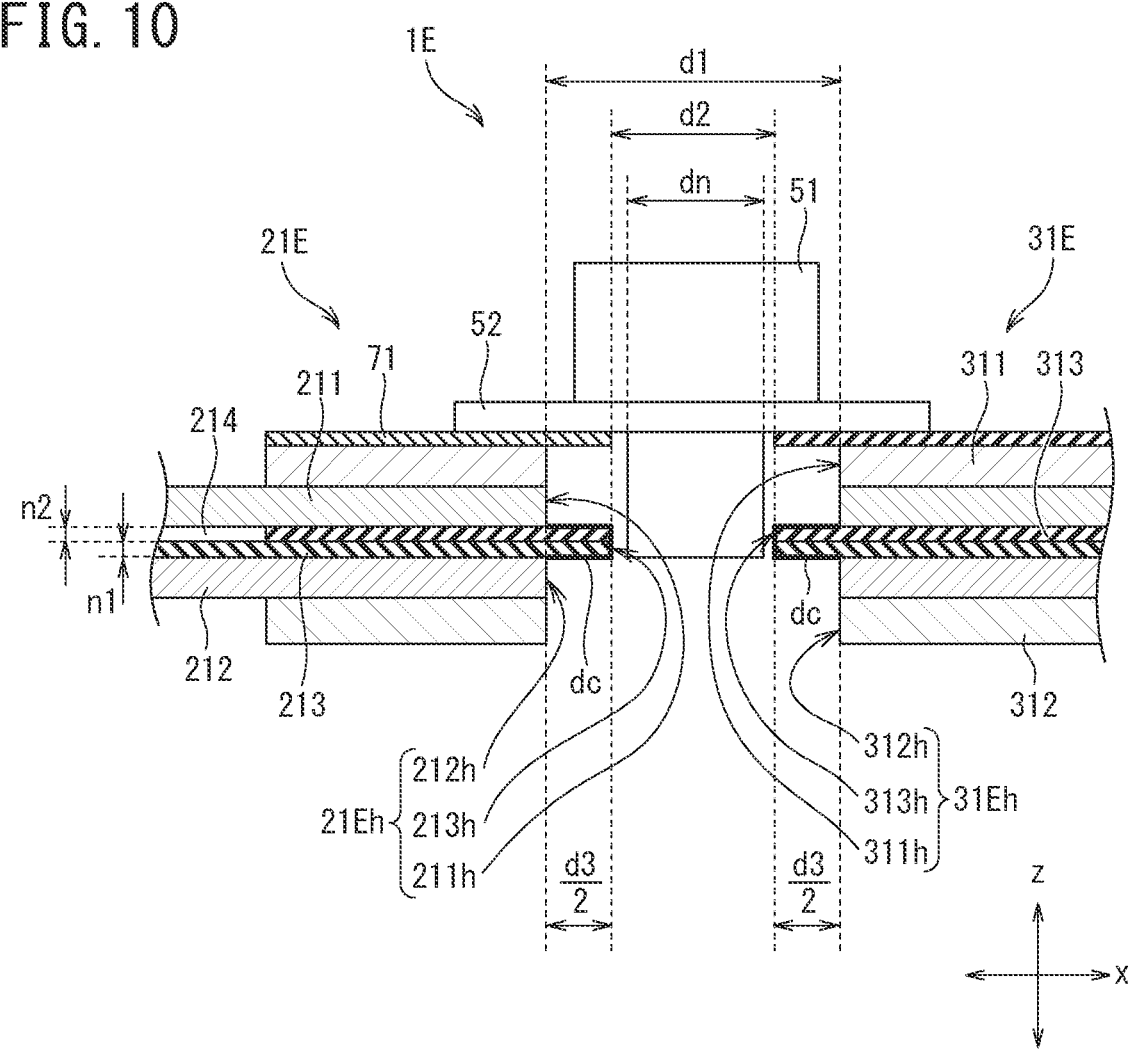
FIG. 10 is a schematic view illustrating an enlarged cross section in a vicinity of the fitting portion of the capacitor and the semiconductor module included in the power converter according to Embodiment 5 of the present invention.

A power converter according to Embodiment 5 of the present invention is described using FIGS. 9 and 10. In the description of a power converter 1E according to the present embodiment, components that have the same operations and functions as those of the components of the power converter 1A according to Embodiment 1 above are denoted by the same reference signs, and descriptions thereof are omitted.

FIG. 9 is a diagram illustrating an example of a schematic configuration of the power converter 1E according to the present embodiment. An upper stage of FIG. 9 illustrates an enlarged vicinity of a fitting portion of the power converter 1E as viewed along the z direction (i.e., a planar view), and a lower stage of FIG. 9 illustrates a cross section cut along line A-A illustrated in the upper stage of FIG. 9. FIG. 10 illustrates an enlarged vicinity of a first bus bar 21E and a second bus bar 31E in the cross section of the power converter 1E illustrated in the lower stage of FIG. 9. In FIG. 10, for ease of understanding, a support member 41 included in the power converter 1E is not illustrated.

As illustrated in FIG. 9, the power converter 1E according to the present embodiment includes a capacitor 2E including the first bus bar 21E that includes the positive electrode terminal 211, the negative electrode terminal 212 arranged to face the positive electrode terminal 211 with the first gap 214, and the first insulating member 213 arranged in the first gap 214 and that is arranged in an exposed manner and a semiconductor module 3E including the second bus bar 31E that includes the positive electrode input terminal 311 overlapped with and connected to the positive electrode terminal 211, the negative electrode input terminal 312 arranged to face the positive electrode input terminal 311 with the second gap 314 and overlapped with and connected to the negative electrode terminal 212, and the second insulating member 313 arranged between the positive electrode input terminal 311 and the negative electrode input terminal 312 and including the contact surface 313c in contact with one of the front surface 213a or the back surface 213b of the first insulating member 213 and that is arranged in an exposed manner and fitted with the first bus bar 21E. In the present embodiment, the contact surface 313c of the second insulating member 313 is in contact with the front surface 213a of the first insulating member 213.

The first bus bar 21E has the same configuration as that of the first bus bar 21A in Embodiment 1 above except that the former has a first through hole 21Eh (details are described later). The second bus bar 31E has the same configuration as that of the second bus bar 31A in Embodiment 1 above except that the former has a second through hole 31Eh (details are described later). Therefore, regarding the first and second bus bars 21E and 31E, configurations other than the first and second through holes 21Eh and 31Eh are not described.

As illustrated in the lower stage of FIG. 9, the first bus bar 21E includes the first through hole 21Eh that penetrates through the positive electrode terminal 211, the negative electrode terminal 212, and the first insulating member 213. The second bus bar 31E includes the second through hole 31Eh that is arranged to be overlapped with the first through hole 21Eh in a state of being fitted with the first bus bar 21E and that penetrates through the positive electrode input terminal 311, the negative electrode input terminal 312, and the second insulating member 313.

The first through hole 21Eh includes a hole portion 211h formed by penetrating through the positive electrode terminal 211, a hole portion 213h formed by penetrating through the first insulating member 213, and a hole portion 212h formed by penetrating through the negative electrode terminal 212. The hole portions 211h and 212h have a circular shape with the same diameter length. The hole portion 213h has a circular shape with a diameter shorter than that of the hole portions 211h and 212h. Therefore, the first through hole 21Eh has a shorter diameter in the first insulating member 213 than the positive and negative electrode terminals 211 and 212.

The second through hole 31Eh includes a hole portion 311h formed by penetrating through the positive electrode input terminal 311, a hole portion 313h formed by penetrating through the second insulating member 313, and a hole portion 312h formed by penetrating through the negative electrode input terminal 312. The hole portions 311h and 312h have a circular shape with the same diameter length. The hole portion 313h has a circular shape with a diameter shorter than that of the hole portions 311h and 312h. Therefore, the second through hole 31Eh has a shorter diameter in the second insulating member 313 than the positive and negative input terminals 311 and 312.

The hole portions 211h and 212h and the hole portions 311h and 312h have a circular shape with the same diameter length. The hole portions 213h and 313h have a circular shape with the same diameter length. The hole portions 211h, 212h, 213h, 311h, 312h, and 313h are aligned with each other's central axes on a straight line. Accordingly, when the first and second bus bars 21E and 31E are in the fitted state, the first and second through holes 21Eh and 31Eh have the same diameter in the positive electrode terminal 211, the negative electrode terminal 212, the positive electrode input terminal 311, and the negative electrode input terminal 312, the same diameter in the first and second insulating members 213 and 313, and are concentric.

As illustrated in the lower stage of FIG. 9, the power converter 1 includes the support member 41 made of an insulating member and supporting the first and second bus bars 21E and 31E that are in the fitted state. The support member 41 is provided under the negative electrode input terminal 312. Therefore, the support member 41 supports the fitting portion of the first and second bus bars 21E and 31E from under the first and second bus bars 21E and 31E. The support member 41 includes a protrusion 411 to be inserted into at least one of the first through hole 21Eh or the second through hole 31Eh. In the present embodiment, the protrusion 411 is inserted into the hole portions 312h and 212h. Thus, the protrusion 411 is inserted into a part of both the first and second through holes 21Eh and 31Eh. The protrusion 411 has, for example, a height higher than a thickness of a terminal into which the protrusion 411 is to be inserted. In the present embodiment, the protrusion 411 has a height equal to a combined length of thicknesses of each of the negative electrode terminal 212 and the negative electrode input terminal 312. Therefore, the protrusion 411 is arranged in contact with the back surface 213b of the first insulating member 213.

As illustrated in the lower stage of FIG. 9, the support member 41 includes a hole 412 formed in the protrusion 411 and concentric with the first and second through holes 21Eh and 31Eh. The first and second bus bars 21E and 31E are screwed to the support member 41 by a screw 51 inserted into the first through hole 21Eh, the second through hole 31Eh, and the hole 412. For example, a nut, which is not illustrated, is provided to be fixed to the hole 412. The screw 51 is fastened to the nut. This secures the first and second bus bars 21E and 31E to the support member 41.

The power converter 1E includes a third insulating member 71 made of an insulating material. The third insulating member 71 is arranged between the second bus bar 31E and the screw 51 when the first bus bar 21E is inserted into the second gap 314 to fit the first and second bus bars 21E and 31E together. When the second bus bar 31E is inserted into the first gap 214 to fit the first and second bus bars 21E and 31E together, the third insulating member 71 is arranged between the first bus bar 21E and the screw 51. In the present embodiment, the first bus bar 21E is inserted into the second gap 314 to fit the first and second bus bars 21E and 31E together, so that the third insulating member 71 is arranged between the second bus bar 31E and the screw 51.

In the present embodiment, a washer 52 is used between the screw 51 and the third insulating member 71 to improve a force for securing the first and second bus bars 21E and 31E to the support member 41. The screw 51 and the washer 52 are made of a conductive material such as, for example, metal. Thus, the third insulating member 71 is arranged between the washer 52 and the positive electrode input terminal 311 so that the positive electrode input terminal 311 and the positive electrode terminal 211 and the negative electrode terminal 212 and the negative electrode terminal 212 and the negative electrode input terminal 312 do not short-circuit via the washer 52 and the screw 51.

As illustrated in the lower stage of FIG. 9, the semiconductor module 3E includes a cooling body 61 arranged in contact with the support member 41 and cooling the semiconductor module 3E. The semiconductor module 3E includes the cooling body 61 to dissipate heat generated in a plurality of switching elements Q (not illustrated). The support member 41 is arranged in close contact with the cooling body 61. The support member 41 may be arranged in direct contact with the cooling body 61, may be arranged on the cooling body 61 via a thermally conductive member such as thermal grease, or may be fixed to the cooling body 61 by a screw. The support member 41 may be made of an insulating and thermally conductive material. This allows the power converter 1E to transfer heat generated in the first and second bus bars 21E and 31E to the cooling body 61 via the support member 41 and dissipate the heat externally.

Next, using FIG. 10, a description is given of a relationship between insulation distance required for the positive electrode terminal 211, the negative electrode terminal 212, the positive electrode input terminal 311, and the negative electrode input terminal 312 laminated in the fitting portion and the diameter of the first and second through holes 21Eh and 31Eh and the diameter of the screw 51.

As illustrated in FIG. 10, the diameter of the first through hole 21Eh in the positive and negative electrode terminals 211 and 212 and the diameter of the second through hole 31Eh in the positive and negative electrode input terminals 311 and 312 are defined as d1. In other words, the diameter of each of the hole portions 211h, 212h, 311h, and 312h is defined as d1. The diameter of the first through hole 21Eh in the first insulating member 213 and the diameter of the second through hole 31Eh in the second insulating member 313 are defined as d2. In other words, the diameter of each of the hole portions 213h and 313h is defined as d2. A difference between the diameter of the first through hole 21Eh in the positive and negative electrode terminals 211 and 212 and the diameter of the first through hole 21Eh in the first insulating member 213 and a difference between the diameter of the second through hole 31Eh in the positive and negative electrode input terminals 311 and 312 and the diameter of the second through hole 31Eh in the second insulating member 313 are defined as d3. In other words, the difference between the diameter d1 of each of the hole portions 211*h* and 212*h* and the diameter d2 of the hole portion 213*h* is defined as d3, and the difference between the diameter d1 of each of the hole portions 311*h* and 312*h* and the diameter d2 of the hole portion 313*h* is defined as d3. The diameter of the screw 51 is defined as dn, the thickness of the first insulating member 213 as n1, and the thickness of the second insulating member 313 as n2. The thicknesses n1 and n2 are sufficiently short compared to the difference d3, and therefore are regarded as zero and ignored. When an insulation distance between the first and second bus bars 21E and 31E and the screw 51 indicated by a bold line in FIG. 10 is defined as dc, a relationship between Formulae (1) to (3) below is satisfied:

$$dc = (d3/2) \times 2 \quad (1)$$

$$d1 \geq dn + dc \quad (2)$$

and $$d1 > d2 \geq dc \quad (3)$$

A distance from an inner wall surface of the hole portion 211*h* of the positive electrode terminal 211 to a surface of the screw 51 can be expressed as (d1−dn)/2. Similarly, a distance from the surface of the screw 51 to an inner wall surface of the hole portion 212*h* of the negative electrode terminal 212 can also be expressed as (d1−dn)/2. Accordingly, a minimum distance (when d2=dn) along the first and second insulating members 213 and 313 from the inner wall surface of the hole portion 211*h* of the positive electrode terminal 211 to the inner wall surface of the hole portion 212*h* of the negative electrode terminal 212 can be expressed as (d1−dn)/2+(d1−dn)/2=(d1−dn). It is sufficient that this distance is equal to or larger than the required insulation distance dc, so that a relationship of (d1−dn)≥dc holds between the distance and the insulation distance dc. Accordingly, the diameter d1 of each of the hole portions 211*h* and 212*h* is set so that Formula (2) holds.

Next, setting of the diameter d2 of the hole portion 213*h* of the first insulating member 213 and the hole portion 313*h* of the second insulating member 313 is described. The thickness n1 of the first insulating member 213 and the thickness n2 of the second insulating member 313 can be each regarded as zero and ignored. Therefore, the insulation distance dc along the first and second insulating members 213 and 313 is a combined distance of half the length of the difference d3 and half the length of the difference d3, as indicated by the bold line in FIG. 10 and Formula (1). Then, as indicated in Formula (3), the diameter d2 of the hole portion 213*h* of the first insulating member 213 and the hole portion 313*h* of the second insulating member 313 is set to be equal to or greater than the insulation distance dc.

Thus, forming the first and second through holes 21Eh and 31Eh so as to satisfy Formulae (1) to (3) ensures insulation between the positive electrode terminal 211, the negative electrode terminal 212, the positive electrode input terminal 311, and the negative electrode input terminal 312 and the screw 51, and ensures insulation of the first and second insulating members 213 and 313 with respect to the screw 51. This allows the power converter 1E to ensure insulation between the positive electrode terminal 211 and the positive electrode input terminal 311 and the negative electrode terminal 212 and the negative electrode input terminal 312 even with the structure in which the first and second bus bars 21E and 31E are supported by the support member 41.

The first and second bus bars 21E and 31E have the same structure as that of the first and second bus bars 21A and 31A in Embodiment 1 above except that the first and second through holes 21Eh and 31Eh are included. Therefore, the power converter 1E can reduce the inductance value of parasitic inductance in the first and second bus bars 21A and 31A, and thus can reduce inductance in a current path formed between the capacitor 2E and the semiconductor module 3E (see the current path IP illustrated in FIG. 3B).

As described above, the power converter 1E according to the present embodiment can obtain the same effects as those of the power converter 1A according to Embodiment 1 above. Additionally, the power converter 1E according to the present embodiment includes the support member 41, and therefore can improve strength of the fitting portion of the first and second bus bars 21E and 31E.

Furthermore, the power converter 1E can dissipate heat generated in the first and second bus bars 21E and 31E from the cooling body 61 via the support member 41, enabling reduced temperature in the first and second bus bars 21E and 31E. The power converter 1E can also increase mounting density of electronic components such as switching elements Q provided in the semiconductor module 3E by reducing the temperature in the first and second bus bars 21E and 31E. This allows the power converter 1E to be easier to assemble and smaller in size.

Although illustration is omitted, the power converter 1E can obtain the same effects as those described above even when the first insulating member 213 is provided in contact with the positive electrode terminal 211. In addition, the power converter 1E can obtain the above-described effects even with the structure in which the second bus bar 31E is inserted into the first gap 214, as in the power converter 1B according to Embodiment 2 above.

The technological scope of the present invention is not limited to the exemplary embodiments illustrated and described herein, and includes all possible embodiments that provide effects equivalent to the object of the present invention. Furthermore, the technological scope of the present invention is not limited by combinations of features of the present invention defined by the claims, but may be defined by any desired combination of specific features out of all disclosed respective features.

REFERENCE SIGNS LIST 1A, 1Aa, 1B, 1C, 1D, 1E: Power converter
2A, 2Aa, 2B, 2C, 2D, 2E: Capacitor
3A, 3B, 3C, 3E: Semiconductor module
8: Power supply device
11A, 11B, 11C, 11D: Fitting portion
21A, 21Aa, 21B, 21D, 21E: First bus bar
21Eh: First through hole
22, 32: Mold resin
24: Electrode portion
31A, 31B, 31C, 31E: Second bus bar
31Eh: Second through hole
41: Support member
51: Screw
52: Washer
61: Cooling body
71: Third insulating member 91, 92: Conductor
93: AC power supply
94: Resistor element
211, 215: Positive electrode terminal
211h, 212h, 213h, 311h, 312h, 313h: Hole portion
212, 216: Negative electrode terminal
213: First insulating member
213a, 217a: Front surface
213b, 217b: Back surface
214: First gap
217: First insulating member
241: Positive electrode side electrode
242: Negative electrode side electrode
243: Electrode side gap
311, 315: Positive electrode input terminal
312, 316: Negative electrode input terminal
313, 317: Second insulating member
313c, 317c: Contact surface
314: Second gap
411: Protrusion
412: Hole
d1, d2: Diameter
d3: Difference
dc: Insulation distance
IP: Current path
L1A, L1B, L1C, L1D: Facing distance
Q: Switching element

The invention claimed is:

1. A power converter comprising:
a capacitor including a first bus bar configured to include a positive electrode terminal, a negative electrode terminal arranged to face the positive electrode terminal with a first gap, and a first insulating member arranged in the first gap, the first bus bar being arranged in an exposed manner; and
a semiconductor module including a second bus bar configured to include a positive electrode input terminal overlapped with and connected to the positive electrode terminal, a negative electrode input terminal arranged to face the positive electrode input terminal with a second gap and overlapped with and connected to the negative electrode terminal, and a second insulating member arranged between the positive electrode input terminal and the negative electrode input terminal and including a contact surface in contact with one of a front surface or a back surface of the first insulating member, the second bus bar being arranged in an exposed manner and fitted with the first bus bar.

2. The power converter according to claim 1, wherein
when the first bus bar is inserted into the second gap to fit the first bus bar and the second bus bar together, the positive electrode terminal and the negative electrode terminal have a length longer than the positive electrode input terminal and the negative electrode input terminal in a facing direction where the capacitor and the semiconductor module face each other, and
when the second bus bar is inserted into the first gap to fit the first bus bar and the second bus bar together, the positive electrode terminal and the negative electrode terminal have a length shorter than the positive electrode input terminal and the negative electrode input terminal in the facing direction.

3. The power converter according to claim 2, wherein
when the first bus bar is inserted into the second gap to fit the first bus bar and the second bus bar together, the positive electrode input terminal and the negative electrode input terminal have lengths different from each other in the facing direction, and
when the second bus bar is inserted into the first gap to fit the first bus bar and the second bus bar together, the positive electrode terminal and the negative electrode terminal have lengths different from each other in the facing direction.

4. The power converter according to claim 3, wherein
when the first bus bar is inserted into the second gap to fit the first bus bar and the second bus bar together, the second insulating member is in contact with, of the positive electrode input terminal and the negative electrode input terminal, a terminal having a shorter length in the facing direction, and the first insulating member is in contact with, of the positive electrode terminal and the negative electrode terminal, a terminal opposite in polarity to the terminal in contact with the second insulating member, and
when the second bus bar is inserted into the first gap to fit the first bus bar and the second bus bar together, the first insulating member is in contact with, of the positive electrode terminal and the negative electrode terminal, a terminal having a shorter length in the facing direction, and the second insulating member is in contact with, of the positive electrode input terminal and the negative electrode input terminal, a terminal opposite in polarity to the terminal in contact with the first insulating member.

5. The power converter according to claim 1, wherein
when the first bus bar is inserted into the second gap to fit the first bus bar and the second bus bar together, a length of the second gap is determined by a thickness of the first bus bar, and
when the second bus bar is inserted into the first gap to fit the first bus bar and the second bus bar together, a length of the first gap is determined by a thickness of the second bus bar.

6. The power converter according to claim 1, comprising a support member made of an insulating member and supporting the first bus bar and the second bus bar in a fitted state.

7. The power converter according to claim 6, wherein
the first bus bar includes a first through hole penetrating through the positive electrode terminal, the negative electrode terminal, and the first insulating member,
the second bus bar includes a second through hole arranged to be overlapped with the first through hole in a state where the second bus bar is fitted with the first bus bar and penetrating through the positive electrode input terminal, the negative electrode input terminal, and the second insulating member, and
the support member includes a protrusion to be inserted into at least one of the first through hole or the second through hole.

8. The power converter according to claim 7, wherein
in the state where the first bus bar and the second bus bar are fitted together, the first through hole and the second through hole have the same diameter in the positive electrode terminal, the negative electrode terminal, the positive electrode input terminal, and the negative electrode input terminal, have the same diameter in the first insulating member and the second insulating member, and are concentric,
the support member includes a hole formed in the protrusion and concentric with the first through hole and the second through hole, and the first bus bar and the second bus bar are screwed to the support member by a screw inserted into the first through hole, the second through hole, and the hole.

9. The power converter according to claim 8, wherein the first through hole has a shorter diameter in the first insulating member than in the positive electrode terminal and the negative electrode terminal, the second through hole has a shorter diameter in the second insulating member than in the positive electrode input terminal and the negative electrode input terminal, and when the diameter of the first through hole in the positive electrode terminal and the negative electrode terminal and the diameter of the second through hole in the positive electrode input terminal and the negative electrode input terminal are defined as $d1$, the diameter of the first through hole in the first insulating member and the diameter of the second through hole in the second insulating member are defined as $d2$, a difference between the diameter of the first through hole in the positive electrode terminal and the negative electrode terminal and the diameter of the first through hole in the first insulating member and a difference between the diameter of the second through hole in the positive electrode input terminal and the negative electrode input terminal and the diameter of the second through hole in the second insulating member are defined as $d3$, a diameter of the screw is defined as $dn$, and an insulation distance between the first and second bus bars and the screw is defined as $dc$, a relationship between $dc=(d3/2)\times 2$, $d1 \geq dn+dc$, and $d1 > d2 \geq dc$ is satisfied.

10. The power converter according to claim 8, comprising a third insulating member made of an insulating material, wherein the third insulating member is arranged between the second bus bar and the screw when the first bus bar is inserted into the second gap to fit the first bus bar and the second bus bar together, and the third insulating member is arranged between the first bus bar and the screw when the second bus bar is inserted into the first gap to fit the first bus bar and the second bus gar together.

11. The power converter according to claim 9, comprising a third insulating member made of an insulating material, wherein the third insulating member is arranged between the second bus bar and the screw when the first bus bar is inserted into the second gap to fit the first bus bar and the second bus bar together, and the third insulating member is arranged between the first bus bar and the screw when the second bus bar is inserted into the first gap to fit the first bus bar and the second bus bar together.

12. The power converter according to claim 6, wherein the semiconductor module includes a cooling body arranged in contact with the support member and cooling the semiconductor module.

* * * * *